(12) United States Patent
Ho et al.

(10) Patent No.: US 7,583,664 B2
(45) Date of Patent: Sep. 1, 2009

(54) TECHNIQUES FOR TRANSMITTING AND RECEIVING TRAFFIC OVER ADVANCED SWITCHING COMPATIBLE SWITCH FABRICS

(76) Inventors: Michael Ho, 732 W. 27th Avenue, Vancouver, British Columbia (CA) V5Z 2G6; Miriam Qunell, 1077 Collingwood, Naperville, IL (US) 60540; Jason Garratt, 2308 Grant St., Vancouver, British Columbia (CA) V5L 2Z9; Kevin Citterelle, 2646 Granite Court, Coquitlam, British Columbia (CA) V3E 2T9; Jeff Fedders, 964 W. 140th Dr., Westminster, CO (US) 80020; Michael Kauschke, Am Meierhof 19, Braunschweig (DE) 38122; Matthew Adiletta, 244 Sawyer Rd., Bolton, MA (US) 01740; Ernest Kaempfer, Vlie 23, Huizen (NL) 1273WK; Douglas Carrigan, 44 Voxe Hill Rd., Westford, MA (US) 01886

( * ) Notice: Subject to any disclaimer, the term of this patent is extended or adjusted under 35 U.S.C. 154(b) by 838 days.

(21) Appl. No.: 11/025,420

(22) Filed: Dec. 28, 2004

(65) Prior Publication Data

US 2006/0153179 A1    Jul. 13, 2006

(51) Int. Cl.
*H04L 12/50* (2006.01)
*H04Q 11/00* (2006.01)

(52) U.S. Cl. .............. 370/386; 370/369; 370/427; 370/387; 370/466; 370/401

(58) Field of Classification Search ............ 370/401, 370/466, 469, 403, 254, 228, 476, 395.51, 370/369, 395.64, 395.3, 386–388, 427, 370, 370/539, 473, 352, 353, 404–405, 543
See application file for complete search history.

(56) References Cited

U.S. PATENT DOCUMENTS 6,556,573 B1 *    4/2003    Kaaresoja .............. 370/395.64

(Continued)

FOREIGN PATENT DOCUMENTS

CN    1449611    10/2003

(Continued)

OTHER PUBLICATIONS

Malis, Andrew G. et al., *SONET/SDH Circuit Emulation Service Over MPLS (CEM) Encapsulation*, Network Working Group Internet Draft, 24 pages, Jul. 2001.

(Continued)

*Primary Examiner*—Edan Orgad
*Assistant Examiner*—Chuong T Ho
(74) *Attorney, Agent, or Firm*—Blakely, Sokoloff, Taylor & Zafman LLP

(57) ABSTRACT

Techniques for transmitting SONET/SDH traffic over an Advanced Switching compatible switch fabric. In one implementation, SONET/SDH traffic may be aggregated and encapsulated into Advanced Switching compatible packets. In one implementation, the contents of the Advanced Switching compatible packets may be configurable and directions on how to unpack the Advanced Switching compatible packets may be transmitted to end point nodes. In one implementation, SONET/SDH pointer justification generation may be divided between a source node which transmits SONET/SDH traffic to the switch fabric and an end point node which receives SONET/SDH traffic from the switch fabric.

41 Claims, 28 Drawing Sheets

U.S. PATENT DOCUMENTS

| | | | |
|---|---|---|---|
| 6,940,850 B2 * | 9/2005 | Park | 370/369 |
| 6,985,488 B2 * | 1/2006 | Pan et al. | 370/395.3 |
| 7,013,348 B1 * | 3/2006 | Carson et al. | 709/238 |
| 7,170,906 B2 * | 1/2007 | Ofek et al. | 370/498 |
| 7,177,308 B2 * | 2/2007 | Ofek et al. | 370/386 |
| 7,382,789 B2 * | 6/2008 | Yu | 370/401 |
| 2002/0131408 A1 | 9/2002 | Hsu et al. | |
| 2003/0227943 A1 | 12/2003 | Hallman et al. | |
| 2004/0114640 A1 * | 6/2004 | Bhide et al. | 370/907 |
| 2004/0221072 A1 | 11/2004 | Sano et al. | |
| 2004/0264472 A1 * | 12/2004 | Oliver et al. | 370/395.4 |
| 2006/0031555 A1 * | 2/2006 | Sikdar et al. | 709/231 |
| 2006/0098660 A1 * | 5/2006 | Pal et al. | 370/395.51 |
| 2006/0114892 A1 * | 6/2006 | Han et al. | 370/389 |

FOREIGN PATENT DOCUMENTS

| | | |
|---|---|---|
| EP | 1183833 A1 | 3/2002 |
| TW | 479417 | 3/2002 |
| TW | 489578 | 6/2002 |
| TW | 506203 | 10/2002 |
| TW | 546963 | 8/2003 |
| TW | 567422 | 12/2003 |
| TW | 583854 | 4/2004 |
| WO | WO01/20858 | 3/2001 |
| WO | WO 01/20858 A1 | 3/2001 |
| WO | WO 2004/059927 | 7/2004 |
| WO | WO2004/059927 | 7/2004 |

OTHER PUBLICATIONS

Malis, Andrew G. et al., *SONET/SDH Circuit Emulation Over Packet (CEP)*, PWE3 Working Group Internet Draft, 48 pages, Jun. 2004.

Malis, Andrew G. et al., *PWE3 Fragmentation and Reassembly*, internet draft, 14 pages, Feb. 2005.

Tesink, K., *Definitions of Managed Objects for the SONET/SDH Interface Type*, Network Working Group RFC 2558, 74 pages, Mar. 1999.

Xaio, X. et al., *Requirements for Pseudo-Wire Emulation Edge-to-Edge (PWE3)*, Network Working Group RFC 3916, 19 pages, Sep. 2004.

The ATM Forum Technical Committee, *Circuit Emulation Service Interoperability Specification*, Version 2.0, 101 pages, Jan. 1997.

Advanced Switching Interconnect SIG, *Advanced Switching Core Architecture Specification*, Revision 1.0, 368 pages, Dec. 2003.

Zarlink Semiconductor Inc., *MT90880/1/2/3: TDM to Packet Processors*, product data sheet, 97 pages, Dec. 2004.

Zarlink Semiconductor Inc., *ZL50110/11/14: 128, 256 and 1024 Channel CESoP Processors*, product data sheet, 105 pages, Jan. 2005.

McKeown, Nick, *Parallel Packet Buffers*, lecture notes from Stanford University course No. EE384X: Packet Switch Architectures I, 24 pages, Winter 2004.

McKeown, Nick, *Overview of Topics*, lecture notes from Stanford University course No. EE384X: Packet Switch Architectures I, 15 pages, Winter 2004.

McKeown, Nick, *Overview of Lecture Notes*, lecture notes from Stanford University course No. EE384X: Packet Switch Architectures I, 16 pages, Winter 2004.

A. Malis et al., SONET/SDH Circuit Emulation Service Over MPLS (CEM), Jul. 2000, Network Working Group, 7 pages.

PCT Invitation to Pay Additional Fees, International Application No. PCT/US2005/047581.

PCT/US05/047581, Written Opinion, Sep. 5, 2006.

PCT/US05/047581, International Search Report, Sep. 5, 2006.

Mayhew, David et al. "PCI Express and Advanced Switching: Evolutionary Path to Building Next Generation Interconnects," Proceedings of the 11th Symposium on High Performance Interconnects, 2003, pp. 21-29, Piscataway, NJ, USA.

Malis, A. et al. "SONET/SDH Circuit Emulation Service Over MPLS (CEM)," IETF Standard-Working-Draft, Jul. 2000, pp. 1-7, IETF.

Puranik, Kiran S. et al. "Advanced Switching Extends PCI Express," Xcell Journal, Fall 2003, pp. 1-3.

Office Action from counterpart Foreign Application Serial No. 94147137 mailed Jan. 17, 2009, pp. 2-8.

\* cited by examiner

PRIOR ART

| PDU Type | AMID | Multicast/Unicast Flow ID | PDU Sequence Number | SAR Code | SAR Segment Number | NEW PROVISION FLAG |

FIG. 6

TECHNIQUES FOR TRANSMITTING AND RECEIVING TRAFFIC OVER ADVANCED SWITCHING COMPATIBLE SWITCH FABRICS

FIELD OF THE INVENTION

The field of the invention relates generally to data communications.

RELATED ART

Data communication networks receive and transmit ever increasing amounts of data. Data is transmitted from an originator or requestor through a network to a destination, such as a router, switching platform, other network, or application. Along this path may be multiple transfer points, such as hardware routers, that receive data typically in the form of packets or data frames. At each transfer point data must be routed to the next point in the network in a rapid and efficient manner.

Data transmission over fiber optics networks may conform to the SONET and/or SDH standards. SONET and SDH are a set of related standards for synchronous data transmission over fiber optic networks. SONET is short for Synchronous Optical NETwork and SDH is an acronym for Synchronous Digital Hierarchy. SONET is the United States version of the standard published by the American National Standards Institute (ANSI). SDH is the international version of the standard published by the International Telecommunications Union (ITU). Herein reference to SONET includes SDH as well unless otherwise noted.

Techniques are known to transmit SONET over packet switched networks. For example, see "SONET Circuit Emulation over Packet (CEP)" available from IETF as well "SONET Circuit Emulation Service Over MPLS (CEM) Encapsulation" available from the IETF. Advanced Switching (AS) is an emerging standard based packet switching technology that utilizes the same physical and data-link layers of PCI-Express. For a description of AS, see Advanced Switching Core Specification Version 1.0 (2004). AS supports multi-point, peer-to-peer switching and efficient encapsulation of any protocol. AS supports multiple messaging mechanisms and supports key essential features such as quality and class of service, congestion management, high availability and redundancy that are typically found in high-end proprietary switching solutions.

FIG. 1A depicts a standard AS packet format. An AS packet includes link overhead, an AS routing header, and an encapsulated packet payload. Link overhead is compatible with PCI Express and contains a start comma (start), sequence number (seq #), link CRC, and stop comma (stop). The AS routing header contains the information to route the packet through an AS fabric, and a field that specifies the Protocol Interface (PI) of the encapsulated packet. AS switches use only the information contained in the routing header to route packets and do not care about the contents of the encapsulated packet. The encapsulated packet payload is only revealed and unwrapped at the end point nodes. The separation of routing information from the remainder of the packet enables an AS fabric to tunnel packets of any protocol. The PI field in the AS routing header specifies the format of the encapsulated packet. The PI field is inserted by the source node that originates the AS packet and is used by the end point node that terminates the packet to interpret the packet correctly.

BRIEF DESCRIPTION OF THE DRAWINGS

FIG. 6 depicts an example implementation of a SONEToAS protocol interface (PI) subheader portion of a SONEToAS packet in accordance with an embodiment of the present invention.

Note that use of the same reference numbers in different figures indicates the same or like elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

One of the challenges to implementing a SONET/SDH add/drop multiplexer (ADM) node is achieving low latency of the node (i.e., time for SONET/SDH traffic to enter and leave the node). A node may include a SONET/SDH traffic decoder, a switch fabric, and a SONET/SDH encoder. In a system where packet and circuit switched traffic are managed by a single, unified switch fabric, the latency budget for the SONET/SDH node can be a challenge to meet. For example, under SONET/SDH, there is a 25 microsecond maximum latency requirement for each node for high order tributaries and less than 50 microsecond maximum latency requirement for each node for low order tributaries.

Figure 1A:
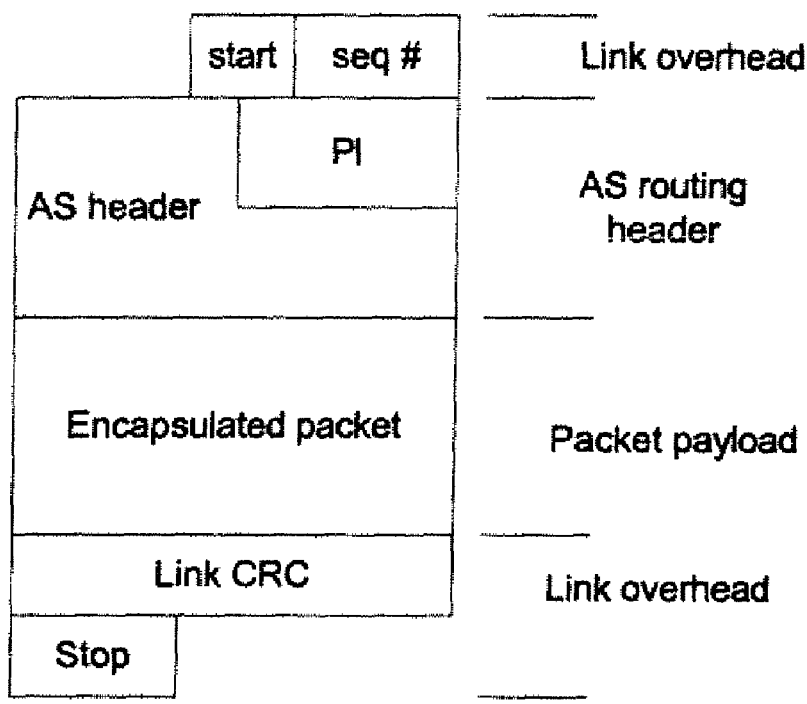
FIG. 1A depicts a standard AS packet format.
Figure 1B:
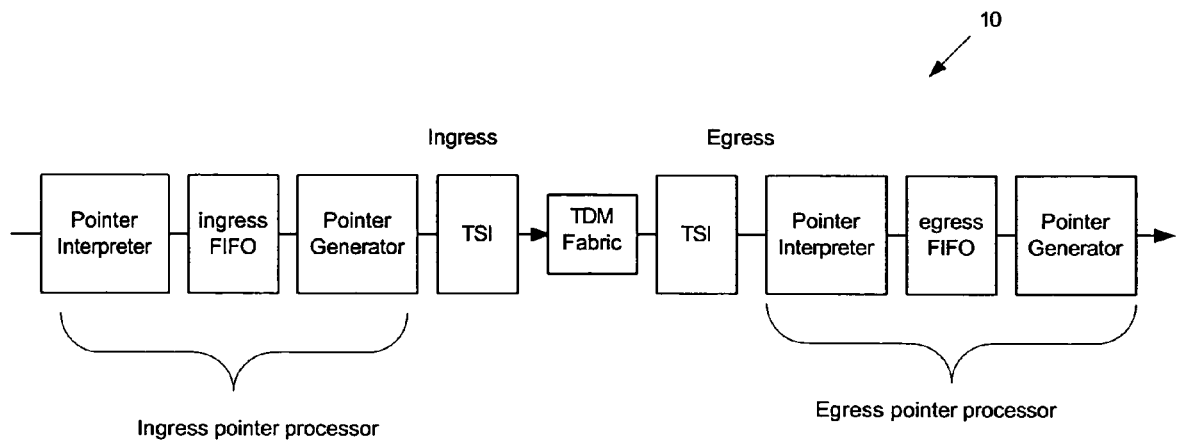
FIG. 1B depicts a portion of a conventional SONET/SDH node.
Figure 1B:
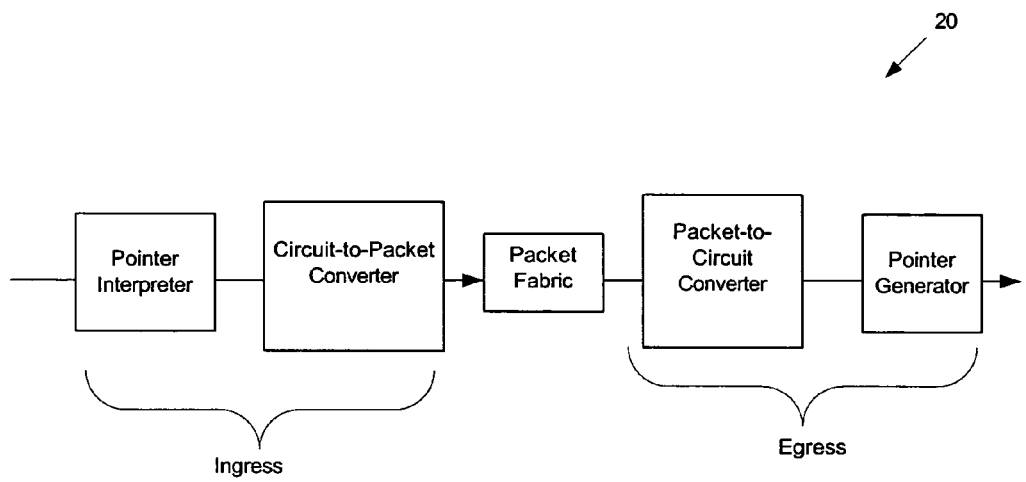

FIG. 1B depicts a portion of a conventional SONET/SDH node in system 10. Major contributors of latency in system 10 include: (1) delays by the ingress FIFO involved in pointer generation; (2) delays involved in ingress timeslot interchange (TSI); (3) delays involved in time-division multiplexed (TDM) (e.g., circuit) fabric/cross-connection times; (4) delays involved in egress timeslot interchange (TSI); and (5) delays by the egress FIFO involved in pointer generation. In the conventional system 10 of FIG. 1B, the latency budget may be met by scheduling timeslots and connection in a synchronized manner to handle a byte at a time and manipulate the SONET/SDH frame in its native format. The synchronization process involves pointer generation to adapt the SONET/SDH streams to a common system clock domain, and to align the timeslots of all incoming SONET/SDH streams. This synchronization enables the TSI and TDM fabric to move timeslots with minimal latency.

In accordance with an embodiment of the present invention, in system 20 shown in FIG. 1B, hybrid data and circuit stream are managed by a single unified fabric. Latency contributors include elements such as circuit-to-packet converter, the asynchronous workings of the switch fabric, packet-to-circuit converter, and elements such as a network processor for data processing (not shown). Circuit-to-packet converter may provide timeslot interchange fabric queues for circuit flows whereas packet-to-circuit converter may provide timeslot interchange and an egress FIFO. System 20, however, can be configured to meet latency requirements in accordance with an embodiment of the present invention.

In accordance with an embodiment of the present invention, system 20 permits optimization of latency for a hybrid data and circuit network node and provides for the transport of SONET/SDH payload end-to-end across a packet fabric while meeting conventional SONET/SDH ADM node latency requirements. In accordance with an embodiment of the present invention, the optimizations may include the following three features (1) to (3).

(1) Using the packet fabric and an egress FIFO as one pointer processing system thereby removing the ingress FIFO for pointer generation and at the ingress endpoint, collecting timeslots to form packets at the beginning of every system period. The system period may be determined by a common clock such as system clock (SysClk). These packets may vary in payload size if the line rate is different from the system clock rate. A field in the header may be used to indicate the number of payload bytes in the AS compatible packet.

(2) Combining circuit-to-packet converter function with the traffic class and connection queues at the fabric endpoints and generating AS headers "on the fly" on the read side of the queues.

(3) Combining the circuit-to-packet converter with the ingress TSI operation, combining the packet-to-circuit converter with the egress FIFO for pointer generation, and combining the packet-to-circuit converter function with the egress TSI function. In addition, data packets may be limited to a maximum size that is based on its allocated bandwidth.

In the above optimizations, combining two functions may optimize the latency by sharing storage elements of the two functions. Because these functions will otherwise be in series, the sharing of storage elements may decrease the total storage elements in the data path reducing latency.

Figure 2:
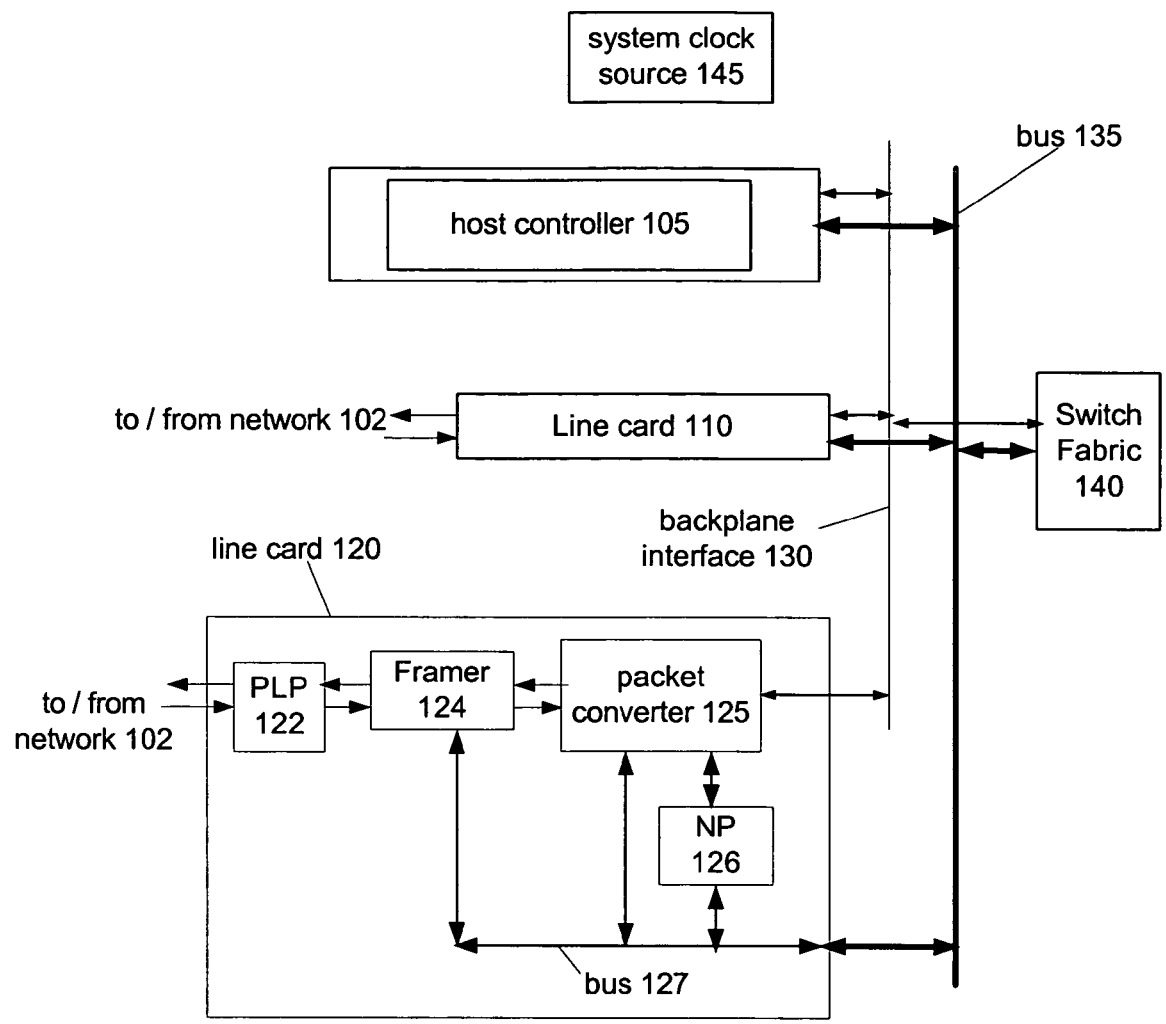
FIG. 2 depicts a suitable system embodiment in accordance with an embodiment of the present invention.

FIG. 2 depicts a suitable system embodiment in accordance with an embodiment of the present invention. System 100 may include host controller 105, line card 110, line card 120, backplane interface 130, bus 135, switch fabric 140, and system clock source 145. System 100 may include more devices such as additional line cards (not depicted) which are similar to line cards 110 and/or 120.

Host controller 105 may control and configure operations of all devices in system 100 (including but not limited to switch fabric 140 and line cards 110 and 120). Host controller 105 may communicate with devices in system 100 using bus 135. For example, host controller 105 may program switch fabric 140 as to the end points of packets transferred to switch fabric 140 having specific header or control contents (e.g., based on FLOWIDs). For example, host controller 105 may program/provision line cards in system 100 (e.g., line card 110 and line card 120) on the contents of packets so as to control a manner of packet assembly and disassembly. For example, host controller 105 may inform members of a protection group of line cards of what members are in a protection partner group. For example, host controller 105 may instruct source and end point line cards how to assign AS packets (including but not limited to SONEToAS packets) into physical ingress portions and from physical egress ports of switch fabric 140. Host controller 105 may be implemented using a line card.

Bus 135 may provide intercommunication at least among host controller 105, line card 110, line card 120, and switch fabric 140. Bus 135 may comply with Peripheral Component Interconnect (PCI) Local Bus Specification, Revision 2.2, Dec. 18, 1998 available from the PCI Special Interest Group, Portland, Oreg., U.S.A. (as well as revisions thereof); PCI Express described in The PCI Express Base Specification of the PCI Special Interest Group, Revision 1.0a (as well as revisions thereof); or PCI-X Specification Rev. 1.0a, Jul. 24, 2000, available from the aforesaid PCI Special Interest Group, Portland, Oreg., U.S.A., although other standards may be used.

Line card 110 may be implemented as a SONET add-drop multiplexer, a Fibre Channel compatible line input, an Ethernet line input, a SONET line input, or a line card similar to line card 120. In one embodiment, line cards 110 and 120 provide support at least for Unidirectional Path-Switched Ring (UPSR) SONET ring topologies as well as, but not limited to, Bi-directional Path-Switched Ring (BLSR), sub-network connection protection (SNCP), multiplex section shared protection ring (MS-SPRing), Automatic Protection Switching (APS), 1+1, 1:1, and 1:N ring topologies. In one embodiment, if line cards 110 and 120 are in a protection group, an Advanced Telecom Computing Architecture (ATCA) update channel may be provided to provide intercommunication between line cards 110 and 120.

Line card 120 may be implemented as a transceiver capable of transmitting frames to network 102 and receiving packets and frames from network 102 in compliance with formats such as SONET as well as other protocols such as OTN, although other standards may be used. For example, network 102 may be any network such as the Internet, an intranet, a local area network (LAN), storage area network (SAN), a wide area network (WAN). For example, SONET/SDH and OTN are at least described for example in: ITU-T Recommendation G.709 Interfaces for the optical transport network (OTN) (2001); ANSI T1.105, Synchronous Optical Network (SONET) Basic Description Including Multiplex Structures, Rates, and Formats; Bellcore Generic Requirements, GR-253-CORE, Synchronous Optical Network (SONET) Transport Systems: Common Generic Criteria (A Module of TSGR, FR-440), Issue 1, December 1994; ITU Recommendation G.872, Architecture of Optical Transport Networks, 1999; ITU Recommendation G.825, "Control of Jitter and Wander within Digital Networks Based on SDH" March, 1993; ITU Recommendation G.957, "Optical Interfaces for Equipment and Systems Relating to SDH", July, 1995; ITU Recommendation G.958, Digital Line Systems based on SDH for use on Optical Fibre Cables, November, 1994; and/or ITU-T Recommendation G.707, Network Node Interface for the Synchronous Digital Hierarchy (SDH) (1996).

One embodiment of line card 120 may include physical layer processor (PLP) 122, framer 124, packet converter 125, network processor (NP) 126, and bus 127. Physical layer processor 122 may receive optical or electrical signals from network 102 and prepare the signals for processing by downstream elements such as framer 124. For example, for packets or frames received from network 102, physical layer processor 122 may convert optical signals to electrical format, perform physical layer processing, and/or remove jitter from signals from the network. For packets or frames to be transmitted to network 102, physical layer processor 122 may remove jitter from signals provided by upstream devices such as framer 124, perform physical layer processing, and prepare signals for transmission to the network, which may be optical or electrical formats.

For packets and frames to be transmitted to network 102, framer 124 may perform overhead generation and construct packets and frames to be transmitted to network 102 in accordance with formats such as SONET and/or OTN (although other formats may be used). For packets and frames received from network 102, framer 124 may de-construct such packets and frames and perform overhead processing and monitoring both in compliance with formats such as SONET and/or OTN (although other formats may be used).

Framer 124 may provide network processor 126 payloads from free of any SONET or OTN overhead but with source and destination addresses resulting from de-encapsulation of data packets and frames with formats such as but not limited to Packet-over-SONET, High Level Data Link Control (HDLC), internet protocol (IP), Asynchronous Transfer Mode (ATM), Generic Framing Procedure (GFP), and Ethernet, although other data packet or frame formats may be supported. Network processor 126 may provide data packets and frames with formats such as but not limited to Packet-over-SONET, HDLC, IP, ATM, GFP, and Ethernet to framer 124 (although other formats may be supported) for encapsulation and transmission to network 102 in accordance with SONET or OTN.

Figure 12:
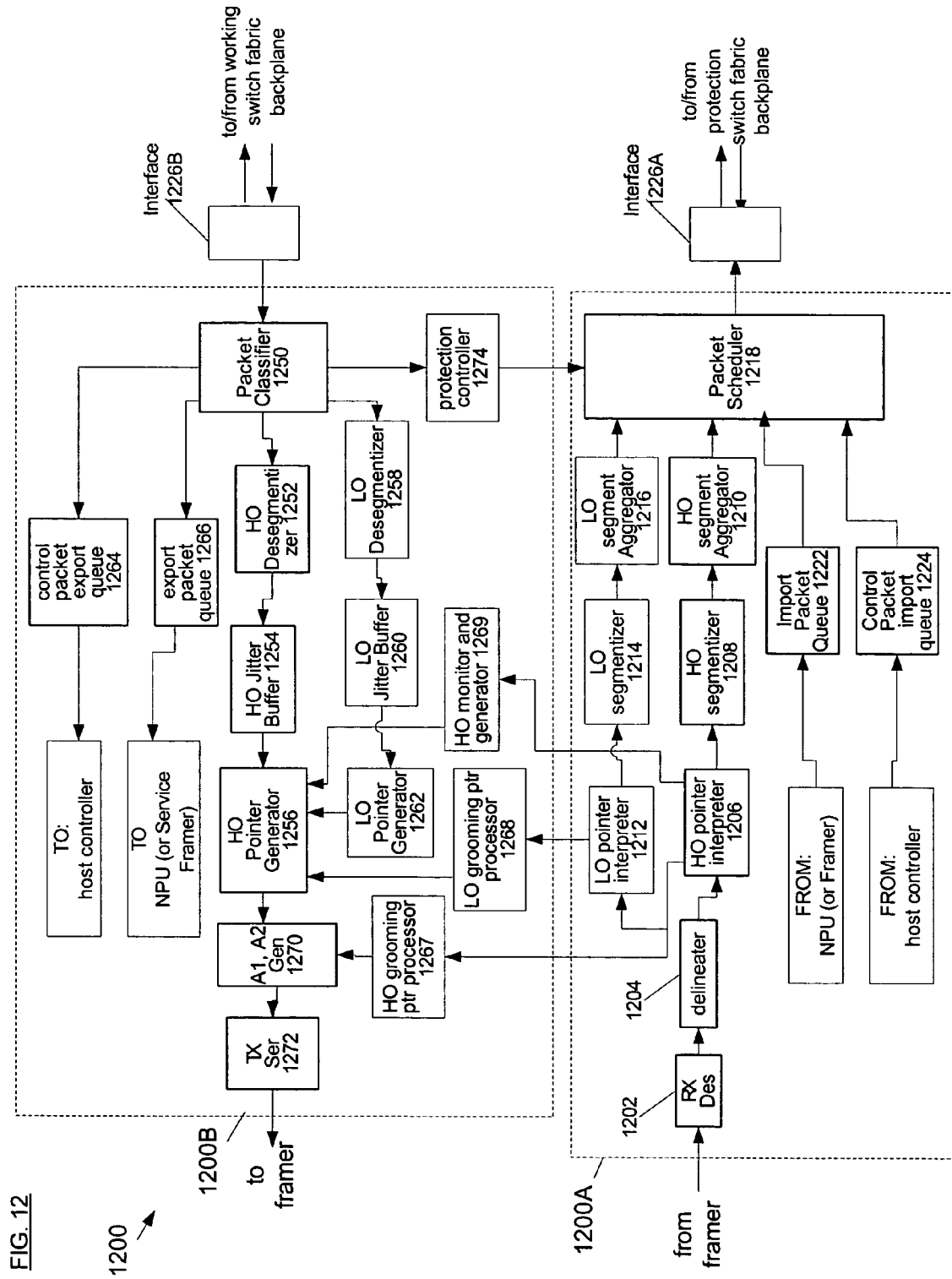
FIG. 12 depicts in block diagram form a transceiver, in accordance with an embodiment of the present invention.

When framer 124 is used with an implementation of packet converter described with respect to FIG. 12, framer 124 may terminate Section and Line overhead bytes (RSOH and MSOH) and framer 124 may optionally terminate path overhead bytes (HPOH). When framer 124 is used with an implementation of packet converter described with respect to FIG. 12, framer 124 and the packet converter may have some overlap in operation such as H1/H2 pointer processing. If a TFI-5 compatible interface is used between framer 124 and packet converter 125, framer 124 may also perform SONET/SDH compliant A1/A2 framing, H1/H2 pointer processing, and any line level protection/restoration schemes such as, but not limited to, UPSR, BLSR, SNCP, MS-SPRing, APS, 1+1, 1:1, and 1: N ring topologies.

In one embodiment, framer 124 may be implemented using an off-the-shelf or commercially available framer such as those available from Intel Corporation. In one embodiment, framer 124 and packet converter 125 may be developed using a single integrated framer-and-packet-converter component.

For example, packet converter 125 may convert SONET frames received from network 102 and to be transmitted to switch fabric 140 into an AS compatible packet. In addition, packet converter 125 may generate synchronous residual time stamps and perform coordination of which protection group member is to transmit at each time slot. In addition, packet converter 125 may convert the following into AS compatible packets for transmission through switch fabric 140 to an endpoint: synchronous residual time stamps; information related to coordination of which protection group member is to transmit at each time slot; and network control related information. In addition, packet converter 125 may encapsulate into AS compatible packets for transmission to switch fabric 140 data packets and frames such as but not limited to Packet-over-SONET, HDLC, IP, ATM, GFP, and Ethernet.

For example, for SONET frames received from switch fabric 140 in an AS compatible packet and to be transmitted to network 102, packet converter 125 and framer 124 together may extract contents of SONET frames from AS compatible packets and generate SONET frames. In addition, for AS compatible packets received from switch fabric 140 and to be transmitted to network 102, packet converter 125 may perform: pointer justification generation; determination of which protection group member is to transmit at each time slot; and routing of (1) packets and frames such as but not limited to Packet-over-SONET, HDLC, IP, ATM, GFP, and Ethernet de-encapsulated from AS compatible packets and (2) network control related information.

Packet converter 125 may intercommunicate with switch fabric 140 using backplane interface 130 to transfer and receive AS packets.

Network processor 126 may perform layer 2 (e.g., data link) or layer 3 (e.g., network control) (as well as other higher layer level) processing on data packets and frames transported and to be transported using SONET frames and provided by and to framer 124. Network processor 126 may also perform operations such as, but not limited to, classification, metering and policing, queue management, transmit scheduling, and traffic shaping in conformance with applicable protocols. For example, network processor 126 also may perform traffic management at the internet protocol (IP) layer (described for example in RFC 791 (1981) available from the Defense Advanced Research Projects Agency).

Bus 127 may provide intercommunication among physical layer processor 122, framer 124, packet converter 125, and network processor 126. Bus 127 may be compliant with the same standards as those of bus 135.

In one embodiment, components of line card 120 may be implemented among the same integrated circuit. In one embodiment, components of line card 120 may be implemented among several integrated circuits that intercommunicate using, for example, a bus or conductive leads of a motherboard. In one embodiment, components of line card 120 may be implemented using one or more microchips. In one embodiment, components of line card 120 may be implemented as any or a combination of: hardwired logic, software stored by a memory device and executed by a microprocessor, firmware, an application specific integrated circuit (ASIC), and/or a field programmable gate array (FPGA).

Backplane interfaces 130 may be implemented as a single or multi-pin interface and may be used by line cards to intercommunicate with switch fabric 140 or to intercommunicate with other line cards. Backplane interfaces 130 may be any configuration such as mesh, star, dual star, and ring, although other configurations may be used. For example, backplane interfaces 130 may be compatible with TFI-5 (described in TDM Fabric to Framer Interface Embodiment Agreement (2003) available from the Optical Internetworking Forum (OIF)) or CSIX (described in CSIX-L1: Common Switch Interface Specification-L1 (2000)), although other standards may be used.

Switch fabric 140 may transfer packets among line cards based on relevant address and header information. Switch fabric 140 can be implemented as a packet switch fabric. For example, in one embodiment, switch fabric 140 may be implemented using an AS compatible switch fabric. The AS switch fabric may use the same physical-link and data-link layers as those described in the PCI Express architecture. AS provides a multi-point, peer-to-peer switched interconnect standard offering encapsulation of any protocol, multiple messaging mechanisms, as well as quality of service (including congestion management). In one embodiment, switch fabric 140 can be implemented using redundant working and protection switch fabrics.

System clock source 145 may provide a system clock (SysClk) for components of system 100. For example, system clock source 145 may be implemented on a line card.

Figure 3A:
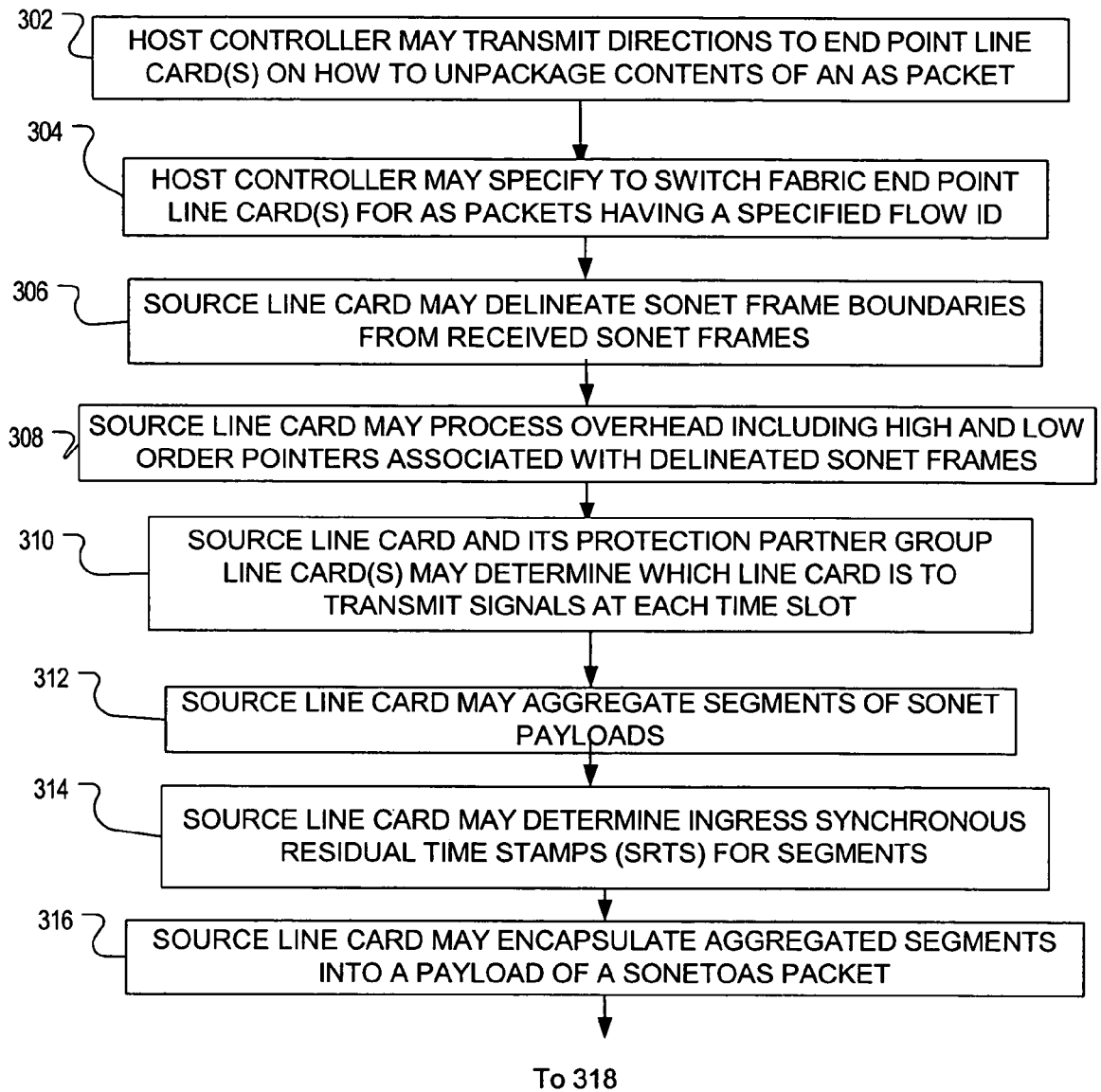
FIG. 3A depicts an example process that can be used for transmission of AS packets to a destination using an AS compatible switch fabric.

FIG. 3A depicts an example process that can be used for transmission of SONET traffic to a destination using an AS compatible switch fabric.

In block 302, a host controller may transmit directions to end point line card(s) on how to unpackage payload contents of AS packets (including but not limited to SONEToAS packets) identified by a specified FLOW ID. For example, a source line card may transmit the AS packet identified with the FLOW ID. For example a FLOW ID may be assigned for each destination, which may include one or more endpoints. For example, block 302 may follow the host controller programming the source line card on how to form AS packets.

In block 304, the host controller may specify to the switch fabric the end point line card(s) for AS packets having a specified FLOW ID.

In block 306, a source line card may delineate SONET frame boundaries from received SONET frames. SONET frames may be received from a network such as but not limited to network 102.

In block 308, the source line card may process overhead from SONET frames including high and low order pointers associated with delineated SONET frames.

In block 310, the source line card and its protection partner group line card(s) may determine which line card is to transmit SONET signals at each time slot. For example, the line cards may determine which line card is to transmit for a given time slot based on comparison of information such as, but not limited to, loss of signal, bit error rate, and alarm indication signal (AIS), although other information may be used. Time slot transmission allocation among protection group members may be renegotiated periodically.

In block 312, the source line card may aggregate segments from SONET payloads based on type (i.e., high or low order), same destination (e.g., one or more end point line cards), and same packet rate (i.e., maximum permitted delay in processing the data prior to transmission to a switch fabric), although other factors may be considered. For example, the packet rate may be measured as the inverse of the packet formation period. The packet formation period may be time takes for a sufficient number of bytes to arrive to form a payload. Packet formation period depends on the size of the payload. It generally takes 125 microseconds to collect one STS-1 SONET frame although SONET frames come in different sizes: STS-1, STS-3, etc. In deciding an applicable packet formation period, one may consider node latency (time to enter and leave a node) (a node may include a source line card routing packets over a switch fabric to a destination line card), fabric latency (time for packet to travel from source node to destination node through a switch fabric), and overspeed (ratio of available bandwidth to payload (excluding overhead)). The packet formation period may be synchronized to the system clock (SysClk).

In block 314, the source line card may determine ingress synchronous residual time stamps (SRTS) for high or low order segments. For example, rather than applying pointer justification at the source (ingress) line card, SRTS information relevant to application of justification can be transmitted to an end point (egress) line card for application of positive or negative justification pointers, if any. The source line card may transmit ingress SRTS associated with the high or low order segments in a SONEToAS packet.

In block 316, the source line card may encapsulate aggregated segments into a payload of a SONEToAS packet.

In block 318, the source line card may form AS packets containing control information relating for example to inter-node communication and management such as acknowledgment and decision of connection action (i.e., which protection group member is to transmit at which time slots) or data packets or frames such as, but not limited to, packet-over-SONET, HDLC, IP, ATM, GFP, and Ethernet. In some instances, in block 318, the source line card may apply segmentation of data packets or control information that exceed a size limit. Application of segmentation can be indicated in a PI subheader of an AS packet that transmits data packets or frames or control information. Reassembly may be applied to the segmented data packets or frames or control information at the end point line card.

In block 320, the source line card may complete headers of the AS packets, including a SONETPI subheader as well as other PI subheaders. PI subheaders may be described in the AS specification.

In block 322, the source line card may determine which AS packet (i.e., at least one of SONEToAS, control information over AS, or data packet over AS) to transmit to the AS compatible switch fabric based on a priority scheme.

In block 324, the source line card may transmit the AS packet to an AS compatible switch fabric.

In block 326, the switch fabric may route the AS packets to the proper end point line cards based on programming by the host controller. For example, the switch fabric may route the AS packet based on the FLOW ID associated with the AS packet.

Figure 3B:
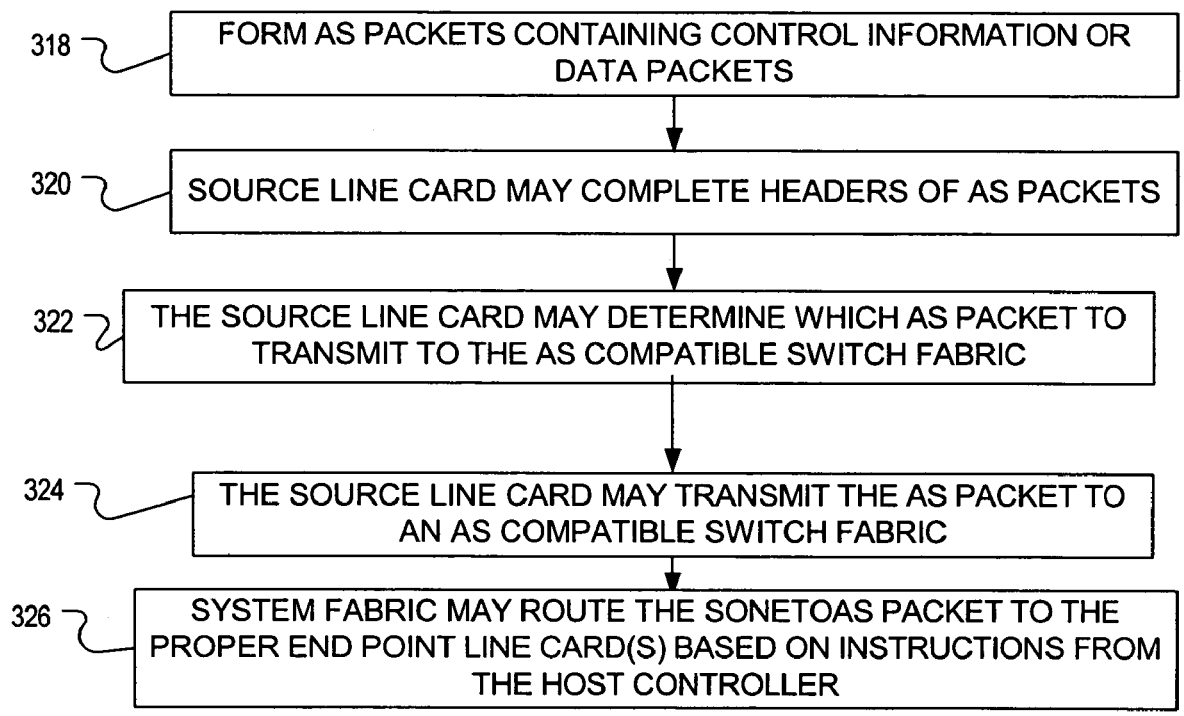
FIG. 3B depicts an example process that can be used by an end point line card to process AS packets.
Figure 3B:
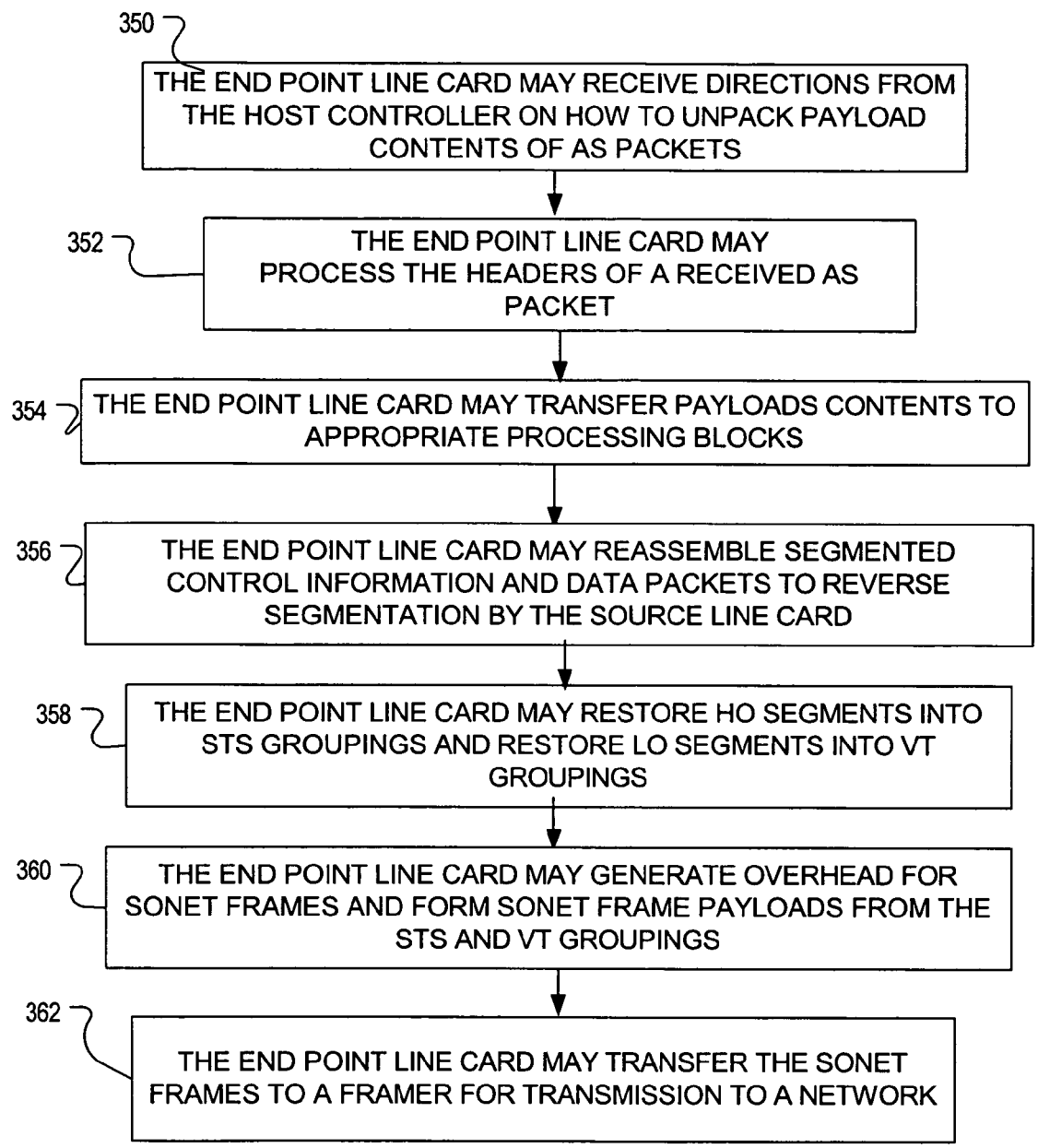

FIG. 3B depicts an example process that can be used by an end point line card to process AS packets (including but not limited to SONEToAS packets). In block 350, the end point line card may receive directions from the host controller on how to unpackage payload contents of AS packets from specific source line cards. For example, unpackaging instructions may be associated with AS packets based on specific FLOW IDs. The host controller may program the source line card to assemble AS packets in a manner such that the end point line card may apply the unpackaging instructions to accurately unpack the AS packets.

In block 352, the end point line card may process the headers of a received AS packet. For example, the end point line card may receive the AS packet from an AS compatible switch fabric. For example, the end point line card may perform physical and link layer translation. For example, the end point line card may provide PI sub-header and payload portions of the AS packet for further processing.

In block 354, based in part on the directions from the host controller on how to unpack payload contents of AS packets, the end point line card may transfer payloads contents to appropriate processing blocks. For example, for SONEToAS packets, payloads contents may include SONET HO segments and LO segments and/or ingress SRTS values. For example, payloads of other AS packets may carry data packets (e.g., including but not limited to HDLC, IP, ATM, GFP, and Ethernet packets and frames); network external/internal control information; and/or protection information (e.g., SONET time slot health information).

In block 356, for control information and data packets, the end point line card may reassemble segmented control information and data packets to reverse segmentation by the source line card. Block 356 may further include de-classification of control information and data packets.

In block 358, for SONEToAS payloads, the end point line card may restore HO segments into STS groupings and restore LO segments into VT groupings.

In block 360, the end point line card may generate overhead for SONET frames and form SONET frame payloads from the STS and VT groupings. For example, the end point line card may selectively generate pointer justification bytes for HO and LO segments based on associated ingress SRTS values and discrepancies between a transmit clock and system clock.

In block 362, the end point line card may transfer the SONET frames to a framer for transmission to a network such as but not limited to network 102.

Figure 4:
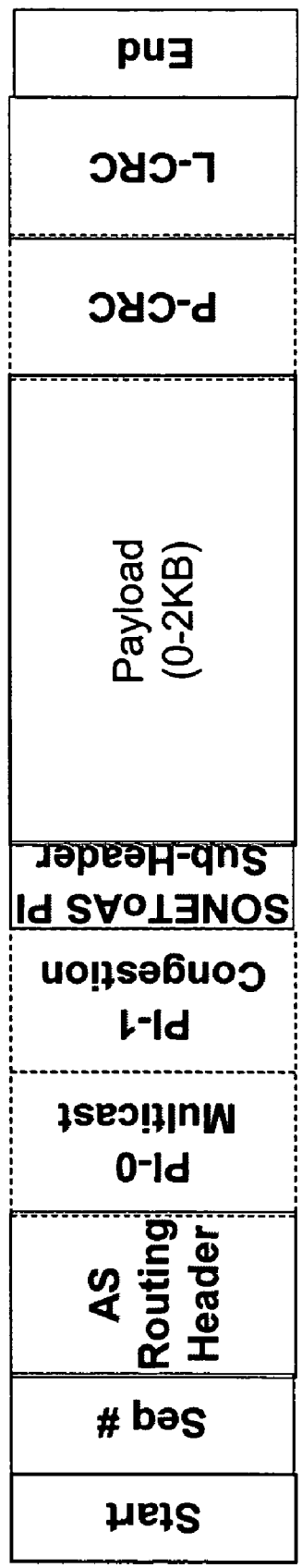
FIG. 4 depicts an example SONEToAS packet structure, in accordance with an embodiment of the present invention.

FIG. 4 depicts an example SONEToAS packet structure, in accordance with an embodiment of the present invention. For example, in one embodiment, a SONEToAS packet may carry SONET traffic and/or ingress SRTS values. Ingress SRTS values can be used by an end point node to generate pointer justification where applicable for high or low order tributaries. For example, the following table provides a list of possible fields in the SONEToAS packet structure and a possible use of each field, although other uses are possible.

| Field Name | Possible byte length | Possible Brief Description |
| --- | --- | --- |
| Start | 1 | May indicate start of a packet. |
| Seq# | 2 | May indicate packet number in a sequence. May be used for detection of loss of packet. |
| AS routing header | | May be an address that the switch fabric uses to determine to what endpoints to forward the packet. |
| PI-0 multicast | 4 | Optional multicast field. May be used for multicast forwarding of the packet by the switch fabric. May be handled outside of the SONEToAS PI. |
| PI-1 congestion | 4 | Optional congestion management field. May be used to slow down any data flows that may be clogging the queues in the switch fabric. May be handled outside of the SONEToAS PI. |
| SONEToAS PI subheader | 4 | May be used to define the set of rules and parameters for encapsulating SONET traffic. |
| Payload | Variable | May include data such as SONET traffic or ingress SRTS values. |
| P-CRC | 4 | Optional payload cyclic redundancy code (CRC). May be used to detect bit errors in the payload portion of the AS packet. |
| L-CRC | 4 | May be used to detect bit errors in the link layer and higher layers of the AS packet. |
| End | 1 | May be used for packet delineation. |

Figure 5:
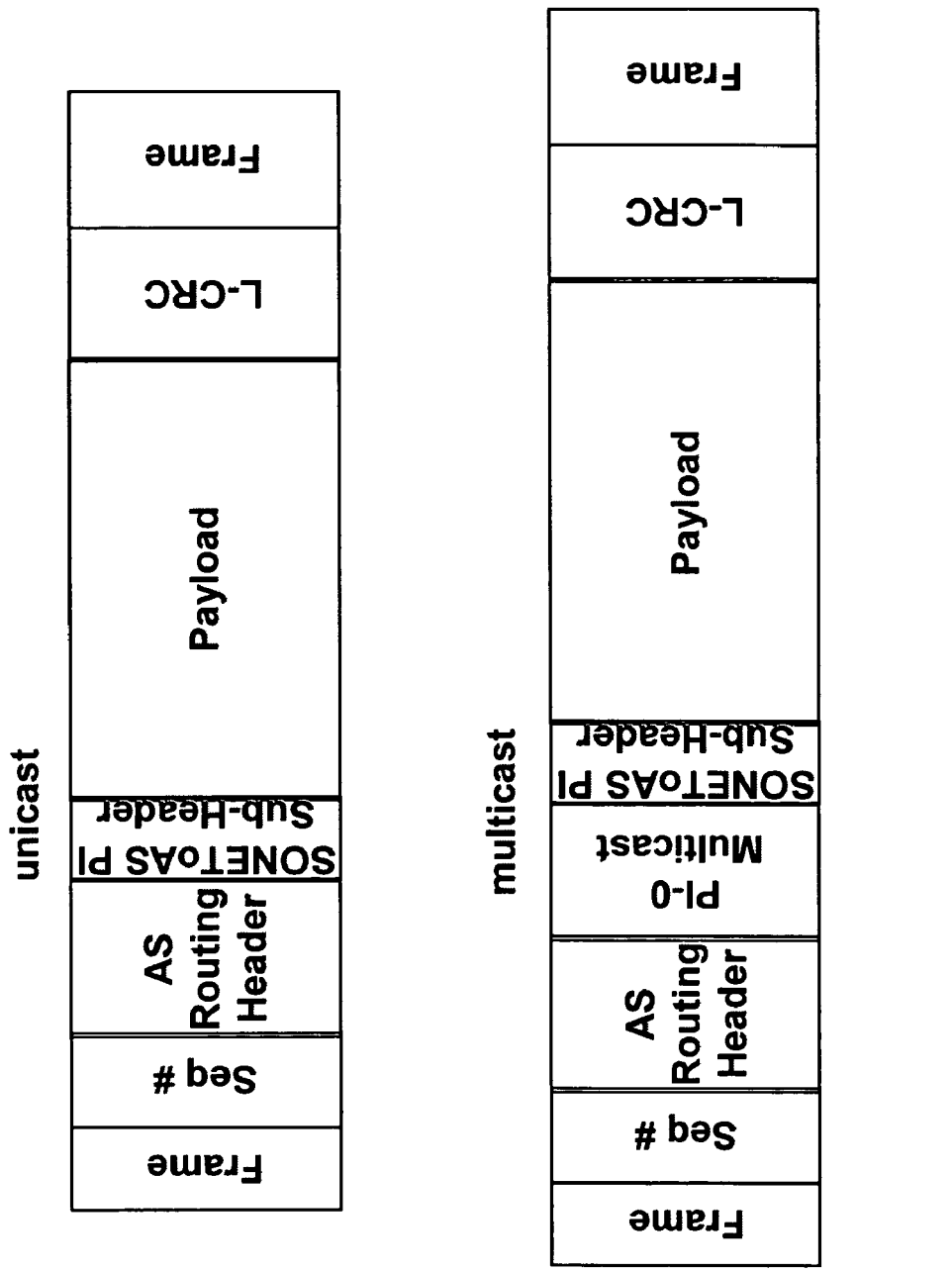
FIG. 5 depicts examples of unicast and multicast SONEToAS packets, in accordance with embodiments of the present invention.

FIG. 5 depicts examples of unicast and multicast SONEToAS packets, in accordance with embodiments of the present invention. For example, a unicast SONEToAS packet that is to be transmitted to a single endpoint with or without segmentation and reassembly (SARing) is depicted and may be approximately 20 bytes in size. For example, a multicast SONEToAS packet structure that is to be transmitted to multiple endpoints with or without SARing is depicted and may be approximately 24 bytes in size.

FIG. 6 depicts an example implementation of a SONEToAS protocol interface (PI) subheader portion of a SONEToAS packet in accordance with an embodiment of the present invention. The SONEToAS PI subheader may in part define rules for encapsulation and identification of SONET traffic. In one embodiment, the SONEToAS PI sub-header may be implemented as 32-bits in size although other lengths may be used. For example, the following table provides a list of possible fields in the SONEToAS PI subheader and a possible use of each field, although other uses are possible.

| Field Name | Possible bit length | Possible Brief description |
| --- | --- | --- |
| PDU Type | 2 bits | May identify contents of payload as either SONET tributary traffic or timestamps, although other uses are possible. The following field definitions may be used:<br>00 = SONET Tributary Traffic<br>01 = Timestamps<br>10 = Unused/Reserved<br>11 = Unused/Reserved |

-continued

| Field Name | Possible bit length | Possible Brief description |
|---|---|---|
| | | May also be used to indicate whether segment lengths are specified in associated preambles. |
| Active Map Identifier (AMID) | 2 bits | May identify a map that is to be used by an endpoint node to unpack traffic in a SONEToAS packet payload. May identify 4 aggregation maps. |
| Multicast/ Unicast FLOW ID | 11 bits | May be a unique identifier for a particular SONEToAS packet type sent by a unique source to specific end point nodes and having a specific payload content and payload arrangement. For example, a unique FLOW ID may be used to identify a map (i.e., unpacking instruction) for an end point node to store and apply. Unicast FLOW IDs do not have to be global, but may be defined within the context of a source/destination virtual connection. The same FLOW ID may be re-used, provided the endpoints are different. For example, 2048 Unique Unicast FLOW IDs per source/end point virtual wire pair may be provided, although other numbers may be used. |
| PDU Sequence number | 8 bits | PDU sequence number with rollover may be incremented for each transmitted SONEToAS packet. PDU sequence number may be used to detect loss of packet (when the segment number skips a count). Rollover provides for rolling the PDU sequence number to 0 or 1 when the PDU sequence number reaches a maximum value. |
| SAR code | 2 bits | Segmentation and reassembly (SAR) code. SAR code may be used to identify whether SARing is used and whether contents of a SONEToAS packet are a portion of a larger group. For example, the following definitions may be used: "00" = intermediate (SARing used and packet is an intermediate packet (i.e., not first or last packet of group of packets)), "01" = terminal (SARing used and packet is a last packet of a group of packets), "10" = initial (SARing used and packet is a first packet of a group of packets), and "11" = singleton (SARing not used; only packet). |
| SAR segment number, with rollover | 7 bits | Segment number is incremented for each transmitted packet for which SAR is applied. It can be used to maintain order (in case SAR packets come out of order) and to detect loss of SAR packet (when the segment number skips a count). |
| Multicast Group Index | 16 bits | Optional multicast field (not depicted). May be used for multicast forwarding of the packet by the switch fabric. May be handled external to the SONEToAS PI definition. |
| NEW PROVISION FLAG | 2 bits | May indicate which map (new or previously used) to apply to unpack SONEToAS packets. |

One embodiment of the present invention includes techniques to aggregate SONET tributaries and then encapsulate aggregated tributaries into SONEToAS packets. Tributaries may include payload content and path overhead from SONET frames. For example, aggregation may take place for SONET payload that is of the same type (i.e., high or low order), has the same destination, and/or has the same packet rate. A destination may include one or more end points. For example, for unicast, a destination is a single end point. For example, for multicast, a destination includes multiple end points.

For example, High Order (HO) tributaries (e.g., STS-1, STS-Nc) having the same destination and same packet rate may be aggregated. For example, Low Order (LO) tributaries (e.g., VT1.5, VT2, VT3, VT6) having the same destination and same packet rate may be aggregated. For example, HO tributaries may have a packet formation period of 3.2 microseconds. For example, LO tributaries may have a packet formation period of 13.88 microseconds. The packet formation period may be an inverse of the packet rate.

The extent of aggregation may be bounded by a limitation provided by the SONET specification of a 25 microsecond maximum latency requirement for each node for high order tributaries and less than 50 microsecond maximum latency requirement for each node for low order tributaries. Other factors limiting aggregation time including packet forwarding speeds and switch fabric speed.

The extent of aggregation may be bounded by multicast limitations. Imposing a restriction on the number of multicast groups may increase the average packet size when aggregating SONET tributaries into packets in a multicast environment. The number of multicast groups can be limited by the types of multicasting allowed in the system. For example if the system allows only uni-cast and dual-cast (i.e. transmission to two different endpoints), the number of multicast groups can be significantly reduced and thereby reduce the latency of payload during the aggregation period. However, other limitations on multicast may be used (e.g., tri-cast).

Figure 7:
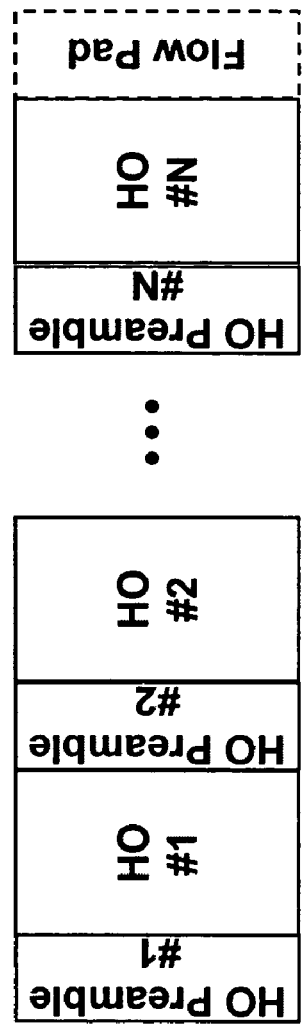
FIG. 7 depicts an example of a tributary aggregation for higher order (HO) tributaries that can be encapsulated into a payload portion of an AS packet, in accordance with an embodiment of the present invention.
Figure 8:
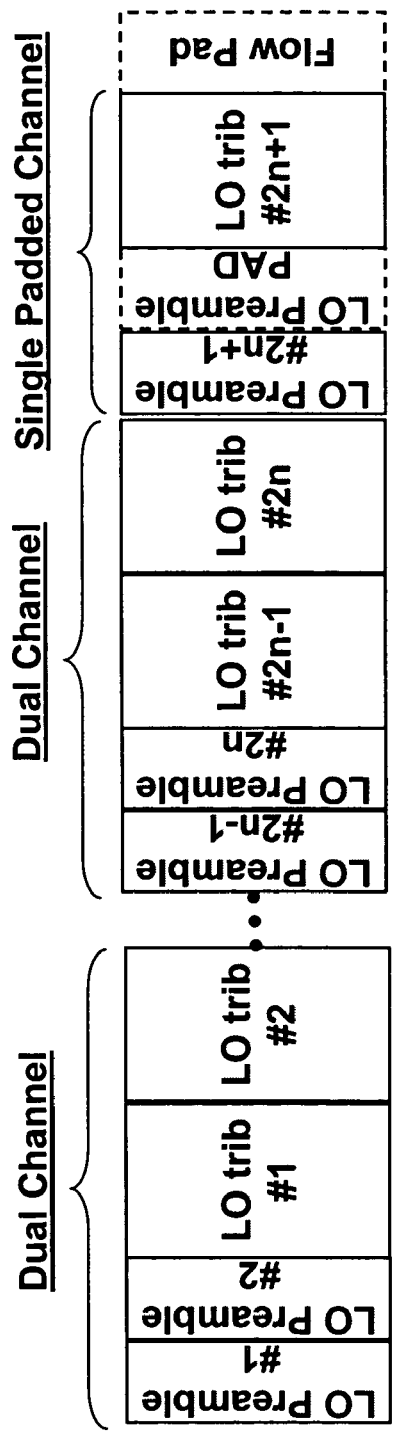
FIG. 8 depicts an example encapsulation of low order (LO) tributaries into a payload portion of an AS packet, in accordance with an embodiment of the present invention.

The aggregated SONET payload may be encapsulated into a payload of a SONEToAS packet in accordance with techniques described with respect to FIGS. 7 and 8. For example, HO or LO SONET tributaries may be arranged into segments with configurable segment length sizing, in accordance with an embodiment of the present invention.

In one embodiment, a nominal segment length and packet rate within an aggregation may be set such that tributaries can be delineated and implicitly identified strictly based on their position within an aggregation, in accordance with an embodiment of the present invention. In one embodiment, segment length may be varied from a nominal segment length and the varied segment length may be communicated within preambles associated with each segment. In one embodiment, each segment preamble may communicate tributary-specific timing information such as J1/V5 frame start, in accordance with an embodiment of the present invention. In one embodiment, tributary preambles and/or the entire aggregation in a SONEToAS packet payload may be padded for 32-bit DWORD alignment, in accordance with an embodiment of the present invention.

FIG. 7 depicts an example of a tributary aggregation for higher order (HO) tributaries (e.g., STS-1, STS-Nc) that can be encapsulated into a payload portion of a SONEToAS packet, in accordance with an embodiment of the present invention. For HO tributary aggregation, multiple HO segments may be appended with HO preambles as depicted. The HO preamble may be 1 byte in size, although other sizes may be used. In one embodiment, the length of each HO segment in an aggregation of HO segments may dynamically adjust +1/−1 bytes from a nominal total length of 35 bytes to account for timing differences, although other sizes may be used. In one embodiment, the nominal length of high order segments may be communicated in an instruction by host controller 105. The configurable length may be based on latency and aggregation/concatenation optimizations. A flow pad may be added. The flow pad may be 0 to 3 bytes in length, although other sizes may be used. The flow pad may provide a 32-bit DWORD alignment for aggregated HO segments and preambles in a SONEToAS packet payload. For example, the following table provides a list of possible definitions of the HO preamble and a possible definition for each value of the HO preamble, although others may be used.

| HO Preamble (bits 7:0) | Possible Definition |
|---|---|
| 00XXXXXX | XXXXXX is the 0-63 byte offset of J1 from the start of the SONEToAS packet payload |
| 01XXXXXX | XXXXXX is the 0-63 byte offset of J1 from the start of the SONEToAS packet payload AND Tells endpoint to increase HO segment size by +1 byte for this HO segment only, then revert to nominal segment length |
| 10XXXXXX | XXXXXX is the 0-63 byte offset of J1 from the start of the payload AND Tells endpoint to decrease HO segment size by 1 byte for this HO segment only, then revert to nominal segment length |
| 11XXXX00 | Tells endpoint to increase HO segment size by +1 byte for this HO segment only, then revert to nominal segment length (does not inform endpoint of J1 location) |
| 11XXXX01 | Tells endpoint to decrease HO segment size by 1 byte for this HO segment only, then revert to nominal segment length (does not inform endpoint of J1 location) |
| 11XXXX1X | Idle, Ignore |

Figure 9:
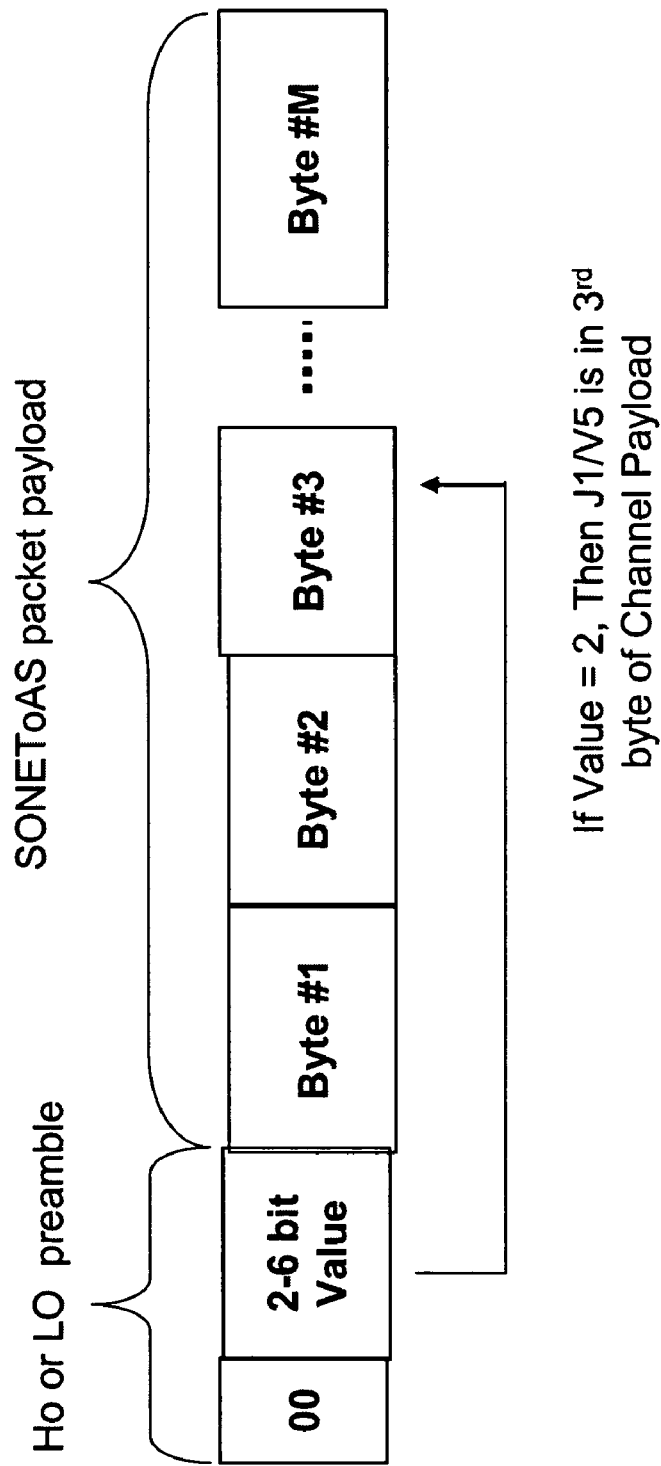
FIG. 9 depicts a scenario where J1 and V5 location fields are indicated in preambles.

As noted in the foregoing table, a J1 offset position from a start of a HO payload may be identified in an HO preamble for HO segments. For example, J1 is an overhead byte defined under SONET that specifies a start of a SONET synchronous payload envelope having HO contents (e.g., STS-1). For example, the example of FIG. 9 depicts a scenario where J1 location field in the HO preamble value of 2 indicates the J1 byte is positioned at the third byte of the SONEToAS packet payload.

In one embodiment, HO segment lengths may variable in size and preambles associated with each segment may define an associated segment length. For example, in a SONEToAS PI subheader, field PDU type can be used to communicate whether each preamble defines a segment length.

FIG. 8 depicts an example encapsulation of low order (LO) tributaries into a payload portion of a SONEToAS packet, in accordance with an embodiment of the present invention. One embodiment of the present invention includes techniques to aggregate multiple LO tributaries (e.g., VT1.5, VT2, VT3, VT6) into a single SONEToAS packet payload. Two LO segments may be appended and utilize a single byte to carry LO preambles associated with each of the two LO segments. For example, as shown, LO preamble #1 and #2 associated with LO tributary #1 and LO tributary #2 may be stored in a single byte. For example, the LO preamble and LO preamble pad can be implemented using 1 shared byte, although other sizes may be used. The LO preamble pad may be used when a pair of LO segments is not available. In one embodiment, the length of each LO segment in an aggregate LO flow may dynamically adjust +1/−1 bytes from a nominal length of 3 bytes to account for timing differences/slips. The LO segment may have a nominal length of 3 bytes but may be configurable based on latency optimizations and VT type, although other sizes may be used. For example, in one embodiment, the nominal length of low order segments may be communicated in an instruction by host controller 105. The flow pad may allow a payload length with aggregated HO segments and preambles to be 32-bit DWORD alignable. The flow pad may be 0 to 3 bytes in length, although other sizes may be used.

For example, the following table provides a list of possible definitions of the LO preamble and a possible definition for each value of the LO preamble, although others may be used.

| LO Preamble (3:0) | Interpretation |
|---|---|
| 00XX | XX is the 0-3 byte offset of V5 from the start of the SONEToAS packet payload |
| 01XX | XX is the 0-3 byte offset of V5 from the start of the SONEToAS packet payload AND Tells endpoint to increase LO segment size by +1 byte for this segment only, then revert to LO nominal segment length |
| 10XX | XX is the 0-3 byte offset of V5 from the start of the SONEToAS packet payload AND Tells endpoint to decrease LO segment size by 1 byte for this LO segment only, then revert to nominal segment length |
| 1100 | Tells endpoint to increase LO segment size by +1 byte for this segment only, then revert to LO nominal segment length (does not inform endpoint of V5 location) |
| 1101 | Tells endpoint to decrease LO segment size by 1 byte for this LO segment only, then revert to nominal segment length (does not inform endpoint of V5 location) |
| 111X | Idle, Ignore |

As noted in the foregoing table, a V5 byte offset position from the start of the SONEToAS packet payload may be identified in an LO preamble for LO segments. As defined in SONET, the V5 byte is the first byte of the virtual tributary. For example, the example of FIG. 9 depicts a scenario where V5 location field in the LO preamble value of 2 indicates the V5 byte is positioned at the third byte of the SONEToAS packet payload.

In another embodiment, LO segment lengths may be variable in size and preambles associated with each segment may define an associated segment length. For example, in a SONEToAS PI subheader, field PDU type can be used to communicate whether each preamble defines a segment length.

Figure 10:
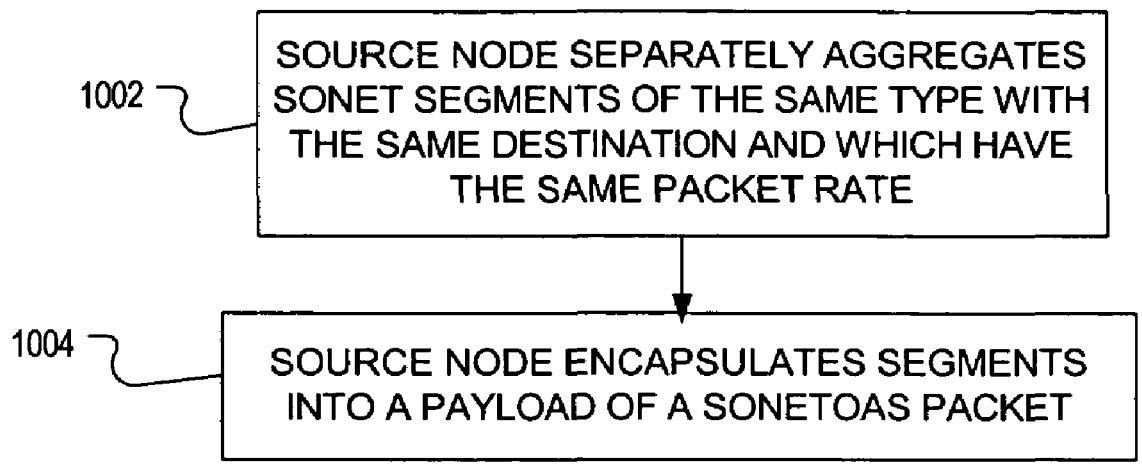
FIG. 10 depicts a process that may be used to aggregate and encapsulate SONET segments into a payload of an AS packet.

FIG. 10 depicts a process that may be used to aggregate and encapsulate SONET segments into a payload of a SONEToAS packet. In block 1002, the source node aggregates SONET segments of the same type (i.e., low and high order) with the same destination and which have the same packet rate. In one embodiment, at a source node, segments with the same destination may be aggregated and assigned a FLOW ID. For example, in one embodiment of the present invention, aggregation may be limited to dual cast destinations (i.e., two end points for a single SONEToAS packet), however, other multi-cast limitations may be used. One factor in limiting aggregation time includes a limitation provided by the SONET specification of a 25 microsecond maximum latency requirement for each node for high order tributaries and less than 50 microsecond maximum latency requirement for each node for low order tributaries. Other factors limiting aggregation time including packet forwarding speeds and switch fabric speed.

In block 1004, the source node encapsulates segments into a payload of a SONEToAS packet. For example, to form a payload with aggregated HO segments, HO segments may be combined in the manner described with respect to FIG. 7. For example, to form a payload with aggregated LO segments, LO segments may be combined in the manner described with respect to FIG. 8. In one embodiment, HO segments may be aggregated together whereas LO segments may be aggregated together but not mixed, however, in one embodiment, the HO and LO segments may be mixed.

Figure 11:
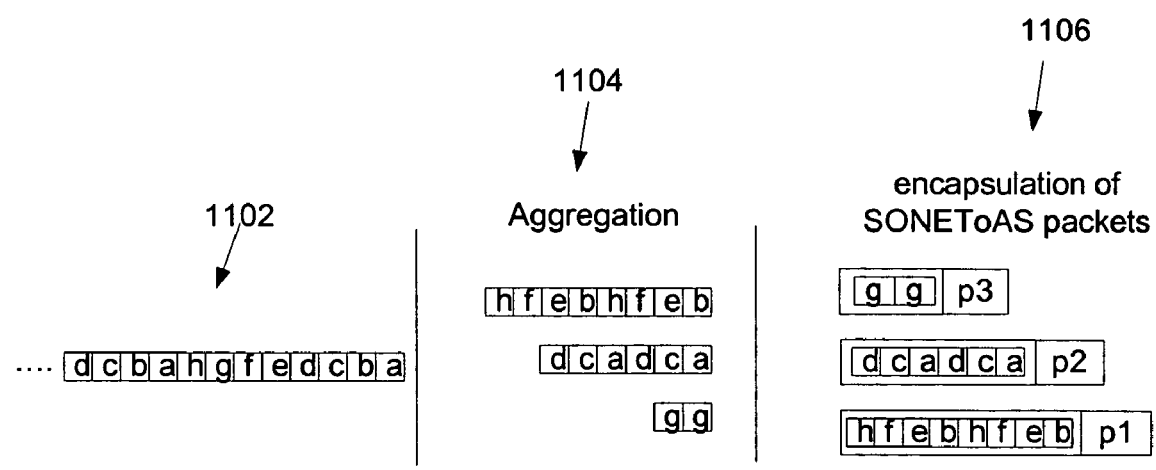
FIG. 11 depicts an example by which tributaries are aggregated, in accordance with an embodiment of the present invention.

FIG. 11 depicts an example by which tributaries are aggregated, in accordance with an embodiment of the present invention. At 1102, a source node receives SONET frames interleaved among channels A-B-C-D-E-F-G-H. For example, each channel may represent a SONET time slot container (e.g., VT1.5, VT2, STS-1, etc.).

At 1104, tributaries are extracted from channels and grouped together with tributaries having the same destination, same order (high or low order) and same packet rate. For example, channels B, E, F and H having a destination of destination 1 are grouped together. For example, channels A, C, and D having a destination of destination 2 are grouped together. For example, channel G has a destination of destination 3 and is without grouping with other channels.

At 1106, channels B, E, F and H are encapsulated into a SONEToAS packet with header p1 provided a unique FLOW ID and bound for destination 1. Similarly, channels A, C, and D are encapsulated into a SONEToAS packet with header p2 provided a unique FLOW ID and bound for destination 2. Similarly, channel G is encapsulated into a SONEToAS packet with header p3 provided a unique FLOW ID and bound for destination 3.

FIG. 12 depicts in block diagram form a transceiver 1200, in accordance with an embodiment of the present invention, that includes (1) transmitter 1200A that can be used by a source node for transmitting AS packets (including but not limited to SONEToAS packets) to an AS switch fabric and (2) receiver 1200B that can be used by a node to receive AS packets from an AS switch fabric, in accordance with an embodiment of the present invention. One embodiment of transmitter 1200A may include: receive (RX) deserializer 1202, delineater 1204, high order (HO) pointer interpreter 1206, HO segmentizer 1208, HO segment aggregator 1210, low order (LO) pointer interpreter 1212, LO segmentizer 1214, LO segment aggregator 1216, packet scheduler 1218, import packet queue 1222, and control packet import queue 1224.

Receive (RX) deserializer 1202 may receive a serialized SONET stream from a framer device such as, but not limited to, framer 124. RX deserializer 1202 may perform serial to parallel format conversion. For example, RX deserializer 1202 may use an SFI-x (such as SFI-5) compatible interface to intercommunicate with the framer device. For example, the SFI-5 interface is described in Serdes Framer Interface Level 5 (SFI-5): Embodiment Agreement for 40 Gb/s Interface for Physical Layer Devices (2002) available from the Optical Internetworking Forum. RX deserializer 1202 may output a parallel format SONET stream.

Delineater 1204 may receive a parallel format SONET stream from RX deserializer 1202. Delineater 1204 may delineate SONET frame boundaries. For example, delineater 1204 may locate A1 and A2 bytes in a parallel format SONET stream to delineate SONET frames. Delineater 1204 may output SONET frames with marked boundaries.

High order (HO) pointer interpreter 1206 may receive SONET frames with boundaries marked. HO pointer interpreter 1206 may locate the first byte of each HO payload. For example, HO pointer interpreter 1206 may interpret H1 and H2 bytes to locate the first byte of each HO payload. HO pointer interpreter 1206 may output SONET frames with J1 byte marked and HO payload identified.

In one embodiment, HO pointer interpreter 1206 may include a decoupling FIFO storage device. A receive clock signal (RxLineClk) and the markers generated by delineater 1204 (e.g., H1, H2 marker and RS/MS Overhead markers) and HO pointer interpreter (payload marker) may be used to time the writing of SONET HO payloads with J1 bytes marked into the decoupling FIFO whereas a system clock signal (SysClk) may be used to time read outs of SONET frames with J1 bytes marked and HO payloads identified from the decoupling FIFO for example for transfer to HO segmentizer 1208. The receive clock signal RxLineClk may be derived by a clock-and-data recovery device in a physical layer processor (e.g., physical layer processor 122) using a rate at which SONET frames are received by the physical layer processor. Receive clock signal (RxLineClk) may be set at a multiple or fraction of such rate at which SONET frames are received.

In one embodiment, HO pointer interpreter 1206 may also determine a difference between payload rate as determined by the clock rates of the receive clock (RxLineClk) and the payload rate as determined by the system clock (SysClk) and represent the difference in an ingress SRTS value. For example, HO pointer interpreter 1206 may use techniques described below with respect to FIG. 14 to determine ingress SRTS values for HO payloads. In one embodiment, an end point line card that receives a SONEToAS packet that transfers the ingress SRTS values may perform justification on an associated SONET stream. Accordingly, justification that might have been performed at an ingress node may instead be performed at a receive node. Though not depicted, HO pointer interpreter 1206 may transfer ingress SRTS values to packet scheduler 1218 for transfer to the same destination as the associated HO payload.

Low order (LO) pointer interpreter 1212 may receive SONET frames with J1 byte and HO payload identified from HO pointer interpreter 1206. LO pointer interpreter 1212 may locate the first byte of each LO payload. For example, LO pointer interpreter 1212 may interpret V1 and V2 bytes to locate the first byte of the LO payload (i.e., V5 byte) and identify the LO payload in the SONET frames with J1 byte and HO payload identified. LO pointer interpreter 1212 may output SONET frames with J1, HO payload, V5, and LO payload marked.

Similar to HO pointer interpreter 1206, LO pointer interpreter 1212 may determine ingress SRTS values but for LO payload. For example, LO pointer interpreter 1212 may use techniques described below with respect to FIG. 14 to determine ingress SRTS values for LO payloads. Though not depicted, LO pointer interpreter 1212 may transfer ingress SRTS values associated with LO payloads to packet scheduler 1218 for transfer to the same destination as the associated LO payload.

HO segmentizer 1208 may receive SONET frames with J1 and HO payload marked from HO pointer interpreter 1206. HO segmentizer 1208 may accumulate HO payload (e.g., STS-1 and STS-Nc) bytes and form segments with associated preambles in accordance with techniques described with respect to FIG. 7. HO segmentizer 1208 may output HO segments with associated preambles.

HO segment aggregator 1210 may receive HO segments and associated preambles from HO segmentizer 1208. HO segment aggregator 1210 may aggregate HO segments having the same destination and having the same packet rate into a payload of a SONEToAS packet. HO segment aggregator 1210 may complete a SONET PI sub-header for each SONEToAS packet.

LO segmentizer 1214 may receive SONET frames with J1, HO payload, V5, and LO payload marked from LO pointer interpreter 1212. LO segmentizer 1214 may accumulate LO payload (e.g., VT) bytes and form LO segments with associated preambles in accordance with techniques described with respect to FIG. 8. LO segmentizer 1214 may output LO segments with associated preambles.

LO segment aggregator 1216 may receive LO segments and associated preambles from LO segmentizer 1214. LO segment aggregator 1216 may aggregate LO segments having the same destination and having the same packet rate into a payload of a SONEToAS packet. LO segment aggregator 1216 may complete a SONET PI sub-header for each SONEToAS packet.

Figure 13A:
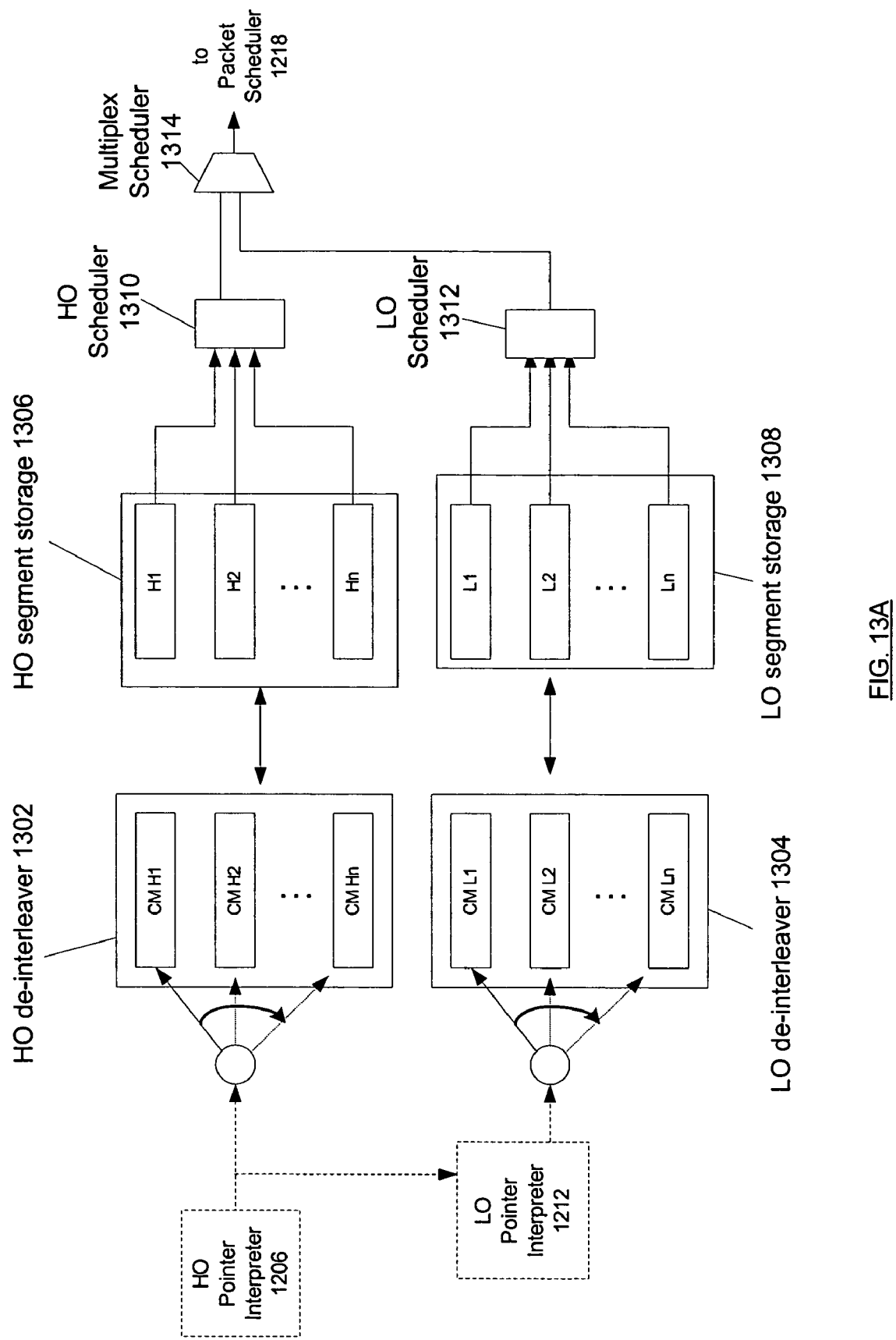
FIG. 13A depicts in block diagram form a device that can form HO or LO segments, in accordance with an embodiment of the present invention.

For example, FIG. 13A depicts in block diagram form a device that HO segmentizer 1208 and HO segment aggregator 1210 or LO segmentizer 1214 and LO segment aggregator 1216 can use to form respective HO or LO segments, in accordance with an embodiment of the present invention. The embodiment of the device of FIG. 13A may include HO de-interleaver 1302, LO de-interleaver 1304, HO segment storage 1306, LO segment storage 1308, HO scheduler 1310, LO scheduler 1312, and multiplex scheduler 1314, although other embodiments may be used. In one embodiment, the device of FIG. 13A may be implemented as any or a combination of: hardwired logic, software stored by a memory device and executed by a microprocessor, firmware, an application specific integrated circuit (ASIC), and/or a field programmable gate array (FPGA).

HO de-interleaver 1302 may include multiple containers (e.g., CM H1 to CM Hn), each for storing HO payload. For example, each container CM H1 to CM Hn may store bytes from a particular STS-1. LO de-interleaver 1304 may include multiple containers (e.g., CM L1 to CM Ln), each for storing LO payload. For example, each container CM L1 to CM Ln may store bytes from a particular VT. HO pointer interpreter 1206 may allocate HO time slots from SONET frames into different containers in HO de-interleaver 1302 (e.g., CM H1 to CM Hn) based on payload markers and time slot identifiers. Time slot identifiers identify a location of a byte in a SONET frame. Timeslot identifiers may be implicitly indicated with the "packaging instructions" for AS packets. LO pointer interpreter 1212 may allocate LO time slots in SONET frames to different containers in LO de-interleaver 1304 (e.g., CM L1 to CM Ln) based on payload markers and time slot identifiers.

HO segment storage 1306 may include containers (e.g., H0 to Hn) that are complementary to containers of HO de-interleaver 1302. HO de-interleaver 1302 may transfer HO payload in some or all containers to complementary containers in HO segment storage 1306 (e.g., H0 to Hn) at periodic intervals timed according to the system clock (SysClk). For example, a periodic interval may be 6.9 microseconds (which may be the packet rate) although the interval can be changed based on desired latency. In one embodiment, HO de-interleaver 1302 and HO segment storage 1306 may be implemented as dynamically configurable link lists so that transfer of contents from HO de-interleaver 1302 to HO segment storage 1306 may occur by transferring pointers.

Similarly, LO segment storage 1308 may include containers (e.g., L0 to Ln) complementary to containers of LO de-interleaver 1304. LO de-interleaver 1304 may transfer LO payload in some or all containers to complementary containers in LO segment storage 1308 (e.g., L0 to Ln) at periodic intervals timed according to system clock (SysClk). For example, a periodic interval (which may be equivalent to the packet rate) may be 13.9 z microseconds although the interval can be changed based on desired latency. In one embodiment, LO de-interleaver 1304 and LO segment storage 1308 may be implemented as dynamically configurable link lists so that transfer of contents from LO de-interleaver 1304 to LO segment storage 1308 may occur by transferring pointers.

In one embodiment, the rate at which HO de-interleaver 1302 and LO de-interleaver 1304 receive payload may be asynchronous to the packet rate, so SONEToAS payload sizes may vary.

HO scheduler 1310 may form HO segments from HO segments stored in HO segment storage 1306 based on instructions from a host controller (such as but not limited to host controller 105). For example, the host controller may instruct the HO scheduler 1310 of contents of which storage locations in HO segment storage 1306 to aggregate together into a segment.

LO scheduler 1312 may form LO segments from LO segments stored in LO segment storage 1308 based on instructions from a host controller. For example, the host controller may instruct the LO scheduler 1312 of contents of which storage locations in LO segment storage 1308 to aggregate together into a segment.

Multiplex scheduler 1314 provides segments of the same type destined for the same egress end-point into the same payload. For example, multiplex scheduler 1314 may selectively transfer segments to packet scheduler 1218 based for example on a step wise quality of service scheduling routine.

In one embodiment, the time to transfer payload from HO de-interleaver 1302 through to the output of multiplex scheduler 1314 may be less than a time that HO de-interleaver 1302 stores payload. Similarly, in one embodiment, the time to transfer payload from LO de-interleaver 1304 through to the output of multiplex scheduler 1314 may be less than a time that LO de-interleaver 1304 stores payload.

In one embodiment, when the implementation of FIG. 13A is used, a length of segments may be included in the HO/LO preambles.

Import packet queue 1222 may store and forward to packet scheduler 1218 data packets and frames from a network processor (such as, but not limited to, network processor 126) such as, but not limited to, packet-over-SONET, HDLC, IP, ATM, GFP, and Ethernet packets and frames. For example, import packet queue 1222 may use a SPIx interface (such as SPI4-2) to intercommunicate with the network processor. Based on instructions from the host controller, the network processor or import packet queue 1222 may map data packets and frames into an AS compatible packet and provide an associated AS protocol interface (PI). For example, the AS standard describes manners to encapsulate at least Ethernet over AS and ATM over AS.

Control packet import queue 1224 may store and forward to packet scheduler 1218 control related information from the host controller. For example, control related information may include: status of line card that uses transmitter 1200A, management controls from user to the line card, and automated processes controlled by software running on host-controller. Based on instructions from the host controller, control packet import queue 1224 may map control related information into a standardized AS encapsulated packet. Control packet import queue 1224 may also provide a PI associated with the AS packet. For example, the AS standard defined PI-8 can be used to transfer control related information.

To prevent latency requirements of HO and LO traffic from not being met, the size of data and/or control information may be segmented so that AS packets containing data and/or control information do not consume too much bandwidth of traffic transmitted from packet scheduler 1218 to a switch fabric.

For example, segmentation of data packets or control information can be performed by the network processor, in import packet queue 1222, or by control packet import queue 1224. In accordance with an embodiment of the present invention, the maximum size of either of data packets and control information may be set and segmentation may be applied for data packets and control information that exceed a prescribed limit. For example, the maximum data packet or control information size (MDPL) may be represented as:

(BWdata/BW)×(NumTS×PL SONET), where

BWdata represents a cap on the bandwidth of a data stream including data packets or control information;
BW represents the total bandwidth output allocated for transfer from the source line card to the switch fabric (e.g., 10 gigabits);
NumTS represents number of STS1 timeslots in the bandwidth (BW); and
PL SONET represents the length of an STS1 frame (including header, overhead, and payload).

Figure 13B:
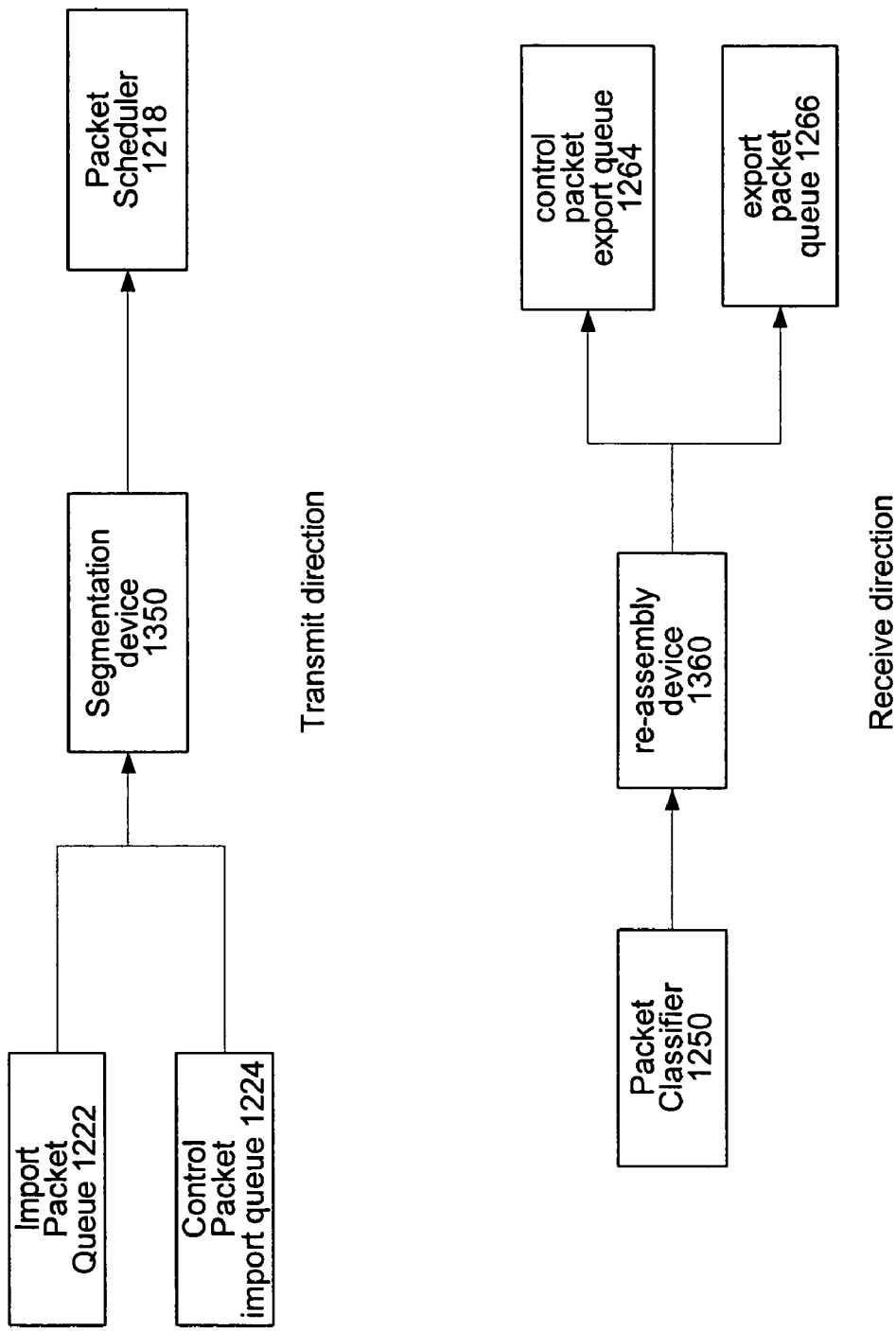
FIG. 13B depicts an example block diagram of a segmentation device that can be used to provide segmentation of data or control information.

FIG. 13B depicts an example block diagram of a segmentation device that can be used to provide segmentation of data or control information. For example, segmentation device 1350 can be used to break up data packets or control information from respective import packet queue 1222 or control packet import queue 1224 into smaller sized portions when the size exceeds the MDPL value described above. Application of segmentation can be indicated in a PI subheader of an AS packet that transmits the segmented data packets or control information. In another embodiment, segmentation can be implemented in the network processor, import packet queue 1222, or control packet import queue 1224.

Packet scheduler 1218 may receive AS packets (e.g., SONEToAS packets as well as other AS packets (e.g., AS packets containing or data packets)). For example, SONEToAS packets may contain LO segments from LO segment aggregator 1216; HO segments from HO segment aggregator 1210; or ingress SRTS values. Other AS packets may carry data packets and frames from import packet queue 1222 (e.g., Packet-over-SONET, HDLC, IP, ATM, GFP, and Ethernet); protection related information from protection controller 1274; as well as control related information from control packet import queue 1224. Packet scheduler 1218 may receive the PI from the appropriate source (e.g., LO segment aggregator 1216, HO segment aggregator 1210, import packet queue 1222, control packet import queue 1224, or protection controller 1274). Packet scheduler 1218 may complete fields in AS packets such as frame start/stop, sequence number, and AS routing header exclusive of the PI.

Packet scheduler 1218 may aggregate ingress SRTS values into SONEToAS packets and provide the appropriate AS routing header (including PI). Ingress SRTS values may be provided by HO pointer interpreter 1206 or LO pointer interpreter 1212. For example, a payload of a SONEToAS packet may be filled or partially filled with ingress SRTS associated with HO or LO segments. SONEToAS packets that transport ingress SRTS may use the same FLOW IDs as the associated SONET payload traffic, but use the PDU type "01", as identified in the SONEToAS PI sub-header. The order of ingress SRTS values in a payload of a SONEToAS packet may be similar to the order of associated segments in a payload of a SONEToAS packet.

In one embodiment, ingress SRTS may be transmitted in a SONEToAS packet that also includes maps that can be used in unpackaging contents of payloads. In one embodiment, a SONEToAS packet including ingress SRTS may be sent whenever pointer interpretation is needed (e.g., when a H1, H2 or V1, V2 byte pair is detected) or in accordance with SONET guidelines (i.e., once every four SONET frames).

In one embodiment, packet scheduler 1218 may choose which type of packets to transfer to the switch fabric (e.g., type may include (1) SONEToAS packets, 2) data packets, 3) protection information, and 4) control packets) based on the storage capacity levels of HO segment aggregator 1210 and LO segment aggregator 1216, import packet queue 1222 and control packet import queue 1224.

In one embodiment, packet scheduler 1218 may prioritize transmission of AS packets based on factors such as packet rate, priority, and type. Packet rate may only apply to SONEToAS packets. The HO packet rate may be twice as fast as the LO packet rate.

In one embodiment, packet scheduler 1218 may apply priority schemes such as strict priority, weighted fair queuing, step-wise QOS scheduling, or simple round robin. Transmission of control information may be higher priority than transmission of data packets or frames. Within the data packet flow there may be several levels of priority.

Figure 13C:
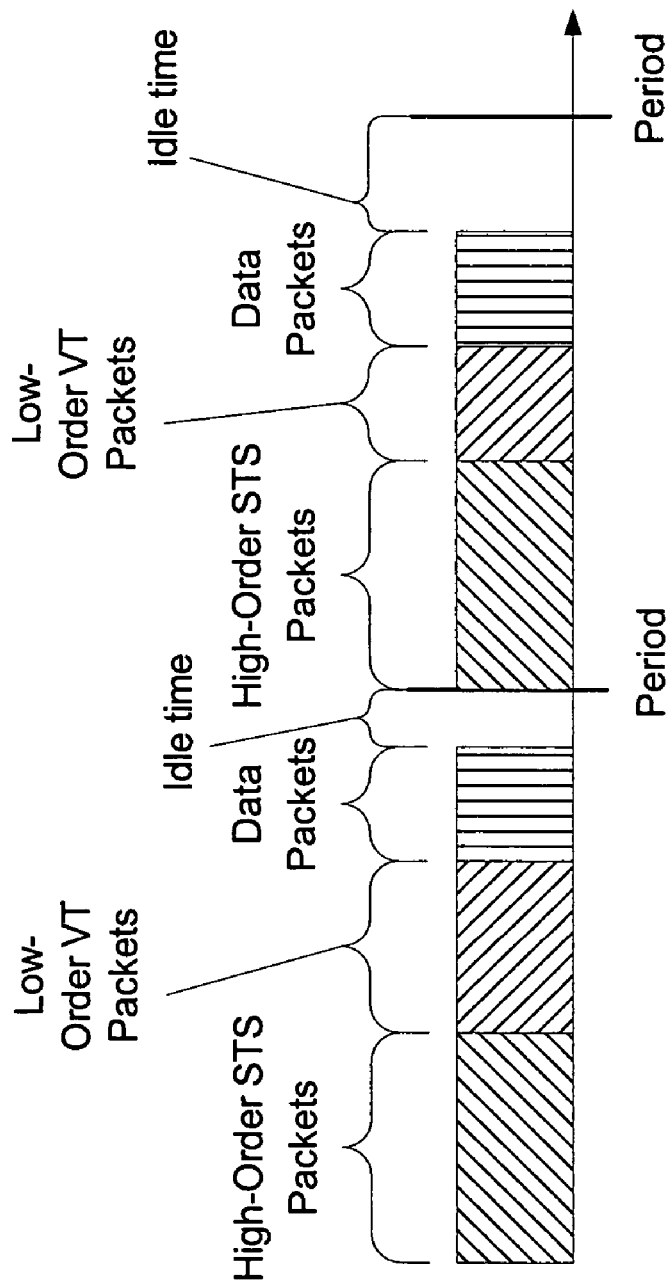
FIG. 13C illustrates a scheme for scheduled and periodic transmission and a variable time period transmission of data packets and frames, in accordance with an embodiment of the present invention.

In one embodiment, packet scheduler 1218 may use a deterministic scheduling scheme to minimize the impact of multiplexing multiple queues to a single AS backplane link. For example, FIG. 13C illustrates a scheme whereby a scheduled and periodic transmission and a variable time period transmission of data packets and frames, in accordance with an embodiment of the present invention. A fixed amount of time may be allocated during which packet scheduler 1218 transmits AS packets containing HO STS. For example the fixed amount of time may be the time to drain an entire page or buffer full of HO STS. The buffer can be the containers of HO segment storage 1306 described with respect to FIG. 13A. Similarly, a fixed amount of time may be allocated during which packet scheduler 1218 transmits AS packets containing LO tributaries. For example the fixed amount of time may be the time to drain an entire page or buffer full of LO tributaries. The buffer can be the containers described with respect to LO segment storage 1308 of FIG. 13A. Any remaining time left can be used to transmit AS packets containing data, protection, or control information. Idle time may be available for overspeed to stabilize the system fabric. AS packets including data packets, protection information, and control information are bursty so there may be no fixed rate at which to transfer to the switch fabric.

In another priority scheme, packet scheduler 1218 may apply a strict priority scheme where by AS packets containing HO traffic are always given priority over AS packets containing LO traffic. LO traffic is given priority over AS packets containing data, protection, or control information. Priority may be assigned among data, protection, and control information.

In another priority scheme, packet scheduler 1218 may apply a weighted fair queuing scheme whereby each type of traffic (e.g., HO, LO, or data/control) such that during a fixed period of time, a percentage of transmission is allocated to each type of traffic. For example, during a fixed period of time, fifty (50) percent of the time can be allocated for transmitting HO traffic, thirty (30) percent of the time can be allocated for transmitting LO traffic, and the remaining time can be allocated for transmitting data, control, or protection traffic. Priority may be assigned among data, protection, and control information.

Interface 1226A may provide physical and link layer compatibility between transmitter 1200A and an AS compatible switch fabric. For example, when the switch fabric is AS compatible, physical and link layers may be compatible with PCI express. Interface 1226A may generate fields in a SONEToAS packet structure such as start, Seq#, AS Routing Header, PI-0 multicast, PI-1 Congestion, P-CRC (optional), Link CRC, and end fields. For AS packets other than SONEToAS, interface 1226A may generate start, Seq #, AS routing header, link CRC, and end fields. The host-controller may configure the header and multicast address for each AS packet. Interface 1226A may assemble AS packets using the generated fields and provide the AS packets to the switch fabric for transmission to the appropriate destination.

Receiver 1200B of transceiver 1200 may include: interface 1226B, packet classifier 1250, HO de-segmentizer 1252, HO jitter buffer 1254, HO pointer generator 1256, LO de-segmentizer 1258, LO jitter buffer 1260, LO pointer generator 1262, control packet export queue 1264, export packet queue 1266, HO grooming pointer processor 1267, LO grooming pointer processor 1268, high order monitor and generator 1269, A1, A2 generator (gen) 1270, transmit serializer (TX Ser) 1272, and protection controller 1274.

Interface 1226B may process fields in AS packets received from the switch fabric such as those generated by interface 1226A. Interface 1226B may provide the PI sub-header and payload.

Packet classifier 1250 may receive AS PI sub-headers and associated payloads from interface 1226B. Packet classifier 1250 may sort contents of payloads for transfer to the appropriate device based in part on content of associated AS PI sub-headers. For example, packet classifier 1250 may route payload contents of HO segments and LO segments to respective HO desegmentizer 1252 and LO desegmentizer 1258; payload contents of data packets (e.g., including POS, HDLC, IP, ATM, GFP, and Ethernet packets and frames) to export packet queue 1266; payload contents including external/internal control streams to control packet export queue 1264; payload contents of protection information to protection controller 1274; and ingress SRTS values to either HO desegmentizer 1252 or LO desegmentizer 1258.

Protection controller 1274 may receive protection information from a protection partner or protection group member. The protection information may have been transmitted to the transceiver through an AS compatible switch fabric using an AS packet and routed to protection controller 1274 by packet classifier 1250. For example, protection information for time slots of a signal received by a protection group member from a UPSR ring may include, but are not limited to, loss of signal, bit error rate, and alarm indication signal (AIS). For example, based on received health information, protection controller 1274 may determine which protection group member is to transmit signals from a UPSR ring at which time slots to the switch fabric.

Further, protection controller 1274 may output health information of signals received from the UPSR ring at selected time slots for transmission to a protection partner. The health information may be conveyed in an AS packet. Protection controller 1274 may provide an AS routing header PI for the protection information. For example, FIG. 20 and accompanying text below describe techniques that may be used to determine which protection group member is to transmit signals at selected time slots.

HO desegmentizer 1252 may group HO segments received from SONEToAS packets into STS groupings. For example, the groupings may be similar to those prior to segmentation by a device similar to that of HO segmentizer 1208 on a transmit side. HO desegmentizer 1252 may determine J1 payload start locations from HO segment preambles. HO desegmentizer 1252 may output HO payload bytes in STS groups with J1 byte marked into HO jitter buffer 1254. If the implementation described with respect to FIG. 13A is used, HO desegmentizer 1252 may determine the length of the payload first.

For received ingress SRTS values, HO desegmentizer 1252 may extract ingress SRTS values for HO segments from SONEToAS packets and then forward ingress SRTS values to HO pointer generator 1256.

HO jitter buffer 1254 may receive HO payload bytes in STS groups with J1 byte marked. HO jitter buffer 1254 may store payload bytes according to their STS grouping timed according to system clock signal (SysClk). HO jitter buffer 1254 may read out payload bytes timed according to transmit clock signal (TxLineClk). For example, transmit clock signal TxLineClk may be a replica of the receive clock RxLineClk or be generated using a high precision clock synthesizer. In one embodiment, HO jitter buffer 1254 may provide payload bytes and J1 markers as requested by HO pointer generator 1256 and provide status (e.g., representing fullness) of each STS buffer to HO pointer generator 1256.

In one embodiment, HO jitter buffer 1254 may store between one and two SONEToAS packet payloads worth of HO bytes, although other quantities may be used. In one embodiment, HO jitter buffer 1254 may include multiple queues each to store a particular STS grouping. In one embodiment, queue size may be dynamic (and configurable) and proportional to the concatenation size of the HO tributary. In one embodiment, queues may be implemented using a link list embodiment. In one embodiment, if contents of a queue either go below a minimum threshold size or exceeds a top threshold, the queue may reset to a configurable level. In one embodiment, writes into the buffer may be bursty with the instantaneous rate greater than the read-out-of-buffer rate. HO jitter buffer 1254 may be configured to have capacity to accommodate transient input and output bursts. In one embodiment, stuff bytes may be written into the HO jitter buffer 1254 when the HO jitter buffer 1254 is empty or when the packet fabric drops packets so that the HO jitter buffer 1254 has information available to read out.

In one embodiment, for HO payloads, HO jitter buffer 1254 may determine a difference between rates of transmit clock signal (TxLineClk) and system clock signal (SysClk) and represent the difference in egress SRTS values. HO jitter buffer 1254 may also determine a difference between rates of the transmit clock signal (TxLineClk) and receive clock signal (RxLineClk) based on a subtraction of ingress SRTS from egress SRTS values. Pointer justification bytes may be generated based on the sum of the subtraction of ingress SRTS from egress SRTS values over time. For example, HO jitter buffer 1254 may use the techniques described with respect to FIG. 15 to provide pointer justification bytes where needed.

LO desegmentizer 1258 may group LO segments received from SONEToAS packets into VT groupings. For example, the groupings may be similar to those prior to segmentation by a device similar to that of LO segmentizer 1214. LO desegmentizer 1258 may determine V5 payload start locations from LO segment preambles. LO desegmentizer 1258 may output LO payload bytes in VT groups with V5 byte marked into LO jitter buffer 1254.

For received ingress SRTS values, LO desegmentizer 1258 may extract ingress SRTS values for LO segments from SONEToAS packets and transfer the ingress SRTS values to LO pointer generator 1262.

LO jitter buffer 1260 may receive LO payload bytes in VT groups with V5 byte marked. LO jitter buffer 1260 may store payload bytes according to their VT groupings timed according to system clock signal (SysClk). LO jitter buffer 1260 may read out LO payload bytes timed according to transmit clock signal (TxLineClk). LO jitter buffer 1260 may provide payload bytes and V5 marker as requested by LO pointer generator 1262 and provide status (e.g., representing fullness) of each VT buffer to LO pointer generator 1262. In one embodiment, LO jitter buffer 1260 may be implemented in a similar manner as that of HO jitter buffer 1254.

In one embodiment, LO jitter buffer 1260 may determine discrepancies between the transmit clock signal (TxLineClk) and system clock (SysClk) in a similar manner as that of HO jitter buffer 1254 and represent the difference in egress SRTS values. LO jitter buffer 1260 may also determine a difference between rates of a transmit clock signal (TxLineClk) and receive clock signal (RxLineClk) based on a subtraction of ingress SRTS from egress SRTS values. Pointer justification bytes may be generated based on the sum of the subtraction of ingress SRTS from egress SRTS values over time. For example, LO jitter buffer 1260 may use the techniques described with respect to FIG. 15 to provide pointer justification bytes where needed.

Control packet export queue 1264 may store and forward to the host controller control related information received in an AS packet such as status of line card that uses receiver 1200B, management controls from user to the line card, and automated processes controlled by software running on host-controller.

Export packet queue 1266 may store and forward to network processor 126 data packets and frames from the AS packet including but not limited to formats such as Ethernet, GFP, HDLC, ATM, and POS packets.

For example, FIG. 13B depicts an example re-assembler device that can be used to re-assemble data packets or control information. For example, re-assembly device 1360 may perform reassembly of data packets or control information segmented by a transmitter such as one similar to transmitter 1200A. Segmented data packets or control information may be provided by packet classifier 1250. Re-assembly device 1360 may provide re-assembled data packets or control information to respective export packet queue 1266 or control packet export queue 1264.

LO grooming pointer processor 1268 may receive SONET frames with J1, HO payload, V5, and LO payload marked from LO pointer interpreter 1212. LO grooming pointer processor 1268 may perform timeslot interchange of LO payload within a common HO payload container of a SONET frame. LO grooming pointer processor 1268 may perform pointer processing to align the location of V1 and V2 bytes to a common SONET frame and HO container. LO grooming pointer processor 1268 may output a groomed SONET frame with J1 marked, V5 marked, and HO and LO payloads marked to HO pointer generator 1256.

High order monitor and generator 1269 may receive SONET frames with J1 and HO payload markers from HO pointer interpreter 1206, along with commands from the host-controller. High order monitor and generator 1269 may process HO path overhead bytes (e.g., J1, B3, N1, F2, F3, K3, G1, H4, and C2). Host controller may control high order monitor and generator 1269 and the host controller may read the results of the processing done by high order monitor and generator 1269.

High order monitor and generator 1269 may generate high-order path overhead bytes (e.g., J1, B3, N1, F2, F3, K3, G1, H4, and C2) automatically or manually as instructed by the host controller. High order monitor and generator 1269 may also generate remote indicators at the HO path layer (e.g., RDI-P, REI-P, etc). High order monitor and generator 1269 may provide remote status indicator signals back to a sender node to tell the sender that the link is down. Remote indicators such as RDI-P, REI-P, etc. may be inserted into the overhead bytes by the transmitter 1200B to be sent back to the sender node. High order monitor and generator 1269 may provide HO segmentizer 1208 with an indication of alarm indication signal (AIS) commands. HO segmentizer 1208 may insert the AIS as per SONET standard when instructed by a user configuration and HO monitor commands.

LO pointer generator 1262 may request LO payload bytes with V5 bytes marked from LO jitter buffer 1260. For example, LO pointer generator 1262 may apply pointer justification where needed (i.e., positive or negative justification) in the relevant overhead bytes using techniques described with respect to FIG. 15. Based on received LO payload bytes with V5 bytes marked, LO pointer generator 1262 may generate a SONET frame with associated H1 H2 bytes and VT bytes inserted in the payload of the SONET frame.

HO pointer generator 1256 may receive a SONET frame with J1 marked, V5 marked, and HO and LO payload marked from LO grooming pointer processor 1268. HO pointer generator 1256 may request HO payload bytes with J1 marked from HO jitter buffer 1254. For example, HO pointer generator 1256 may provide justification bytes where needed (i.e., positive or negative justification in the relevant overhead bytes) using techniques described with respect to FIG. 15. HO pointer generator 1256 may receive a SONET frame with associated H1 H2 bytes and VT bytes inserted in the payload of the SONET frame from LO pointer generator 1262. The SONET frames from LO pointer generator 1262 and LO grooming pointer processor 1268 may be aligned. HO pointer generator 1256 may multiplex the SONET frames and provide the multiplexed frames as an output. HO pointer generator 1256 may output a SONET frame with pointer justification bytes provided (where applicable) in H1 and H2 bytes in the overhead section as well as STS bytes inserted in the payload of the SONET frame. Remote indicators from high order monitor and generator 1269 may be transferred using overhead bytes (e.g., G1 for high-order path overhead and M1 for Line Overhead).

HO grooming pointer processor 1267 may receive SONET frames with J1 bytes marked and HO payload identified from HO pointer interpreter 1206. HO grooming pointer processor 1267 may perform timeslot interchange of HO payloads within a SONET frame. HO grooming pointer processor 1267 may perform pointer processing to align the location of H1 and H2 bytes in a common SONET frame. HO grooming pointer processor 1267 may output a groomed SONET frame with J1 and HO payload markings.

A1, A2 generator (gen) 1270 may receive SONET frames otherwise completed except for uncompleted A1 and A2 overhead bytes from HO grooming pointer processor 1267 and HO pointer generator 1256. A1, A2 generator 1270 may generate A1 and A2 bytes and insert A1 and A2 bytes into SONET frames. A1, A2 generator 1270 may provide SONET frames with SONET overhead and payload completed.

TX serializer 1272 may convert SONET frames from parallel to serial format. TX serializer 1272 may provide SONET frames to a framer such as, but not limited to, framer 124 for transmission to a network such as, but not limited to, network 102.

Justification is a technique described with respect to SONET for example in ANSI T1.105, ANSI T1.106 and ANSI T1.117 that can be used to adjust the payload rate because the payload rate is pleisynchronous to the SONET rate. For example, if the frame rate of the payload that is mapped into STS synchronous payload envelope (SPE) is too slow with respect to the rate of the envelope then the alignment of the payload will periodically slip back or the pointer to the beginning of the SPE may be periodically incremented by one (so called "positive stuffing"). If the rate of payload is too fast with respect to the SPE rate then the alignment of the payload may periodically advance or the pointer to the beginning of the SPE may be periodically decremented by one (so called "negative stuffing").

In a conventional system, when the input data has a rate lower than the output data rate of a storage buffer, positive stuffing may occur. The input data is stored in a buffer at a rate which is controlled by a WRITE clock. Because the output (READ) clock rate is higher than the input (WRITE) clock rate, the buffer content will be depleted or emptied. To avoid this condition, the buffer fill is constantly monitored and compared to a threshold. If the content fill is below a threshold, the READ clock is inhibited and stuffed bit is inserted to the output stream (so called "positive stuffing"). Meanwhile, the input data stream is still filling the buffer. If positive stuffing occurs, the occurrence of positive stuffing can be communicated in overhead of a SONET frame (e.g., in H1 and H2 pointer overhead bytes). In a conventional system, when the input data has a rate higher than the output data rate of a storage buffer, negative stuffing will occur. If negative stuffing occurs, the occurrence of negative stuffing can be communicated in overhead of a SONET frame (e.g., in H1 and H2 pointer overhead bytes).

In accordance with an embodiment of the present invention, in an environment where SONET traffic is transmitted over a switch fabric and then re-formed into SONET traffic, rather than applying justification at an input node (i.e., a node that receives the SONET traffic prior to transmitting the SONET traffic to the switch fabric), justification is applied at an end point node (i.e., a node that receives the SONET traffic from the switch fabric). In accordance with an embodiment of the present invention, at an input node, the difference between a nominal payload byte count and the actual payload byte count over a set period of time is recorded in an ingress Synchronous Residual Time Stamps (SRTS). The ingress SRTS may be encapsulated into a packet (such as in a SONEToAS packet) and transmitted to the end point node or transmitted via the control plane network such as bus 135 to the end point node. At the end point node, justification may be applied based on the ingress SRTS values.

Figure 14:
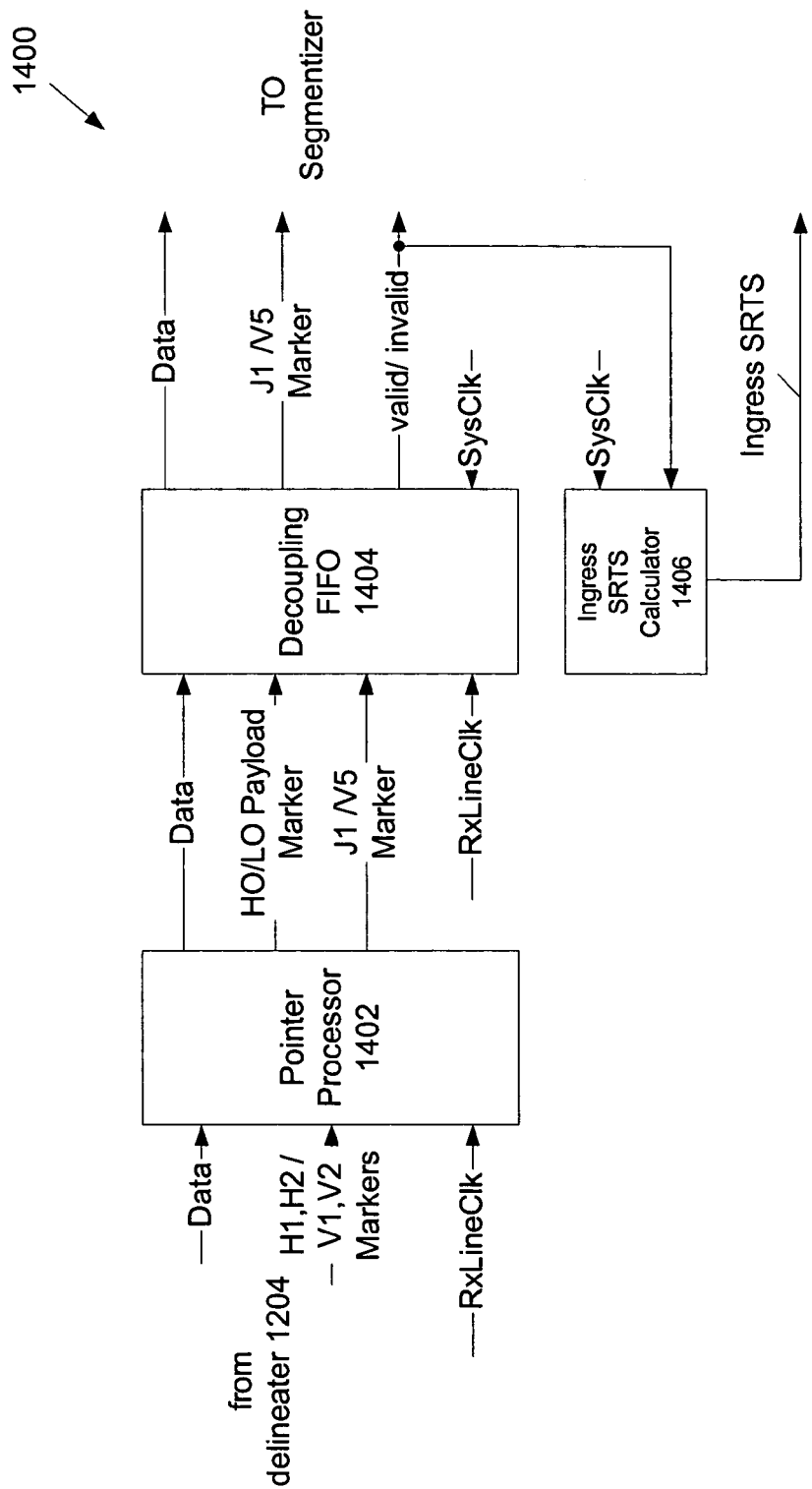
FIG. 14 illustrates a device that can determine ingress SRTS values, in accordance with an embodiment of the present invention.

FIG. 14 depicts in pointer interpreter 1400 a device in block diagram form that can be used to generate ingress SRTS values at an ingress node for HO and LO segments. As shown in FIG. 14, one embodiment of pointer interpreter 1400 may include pointer processor 1402, decoupling FIFO 1404, and ingress SRTS calculator 1406.

Pointer processor 1402 may receive HO or LO payload (shown as data) and respective H1, H2 or V1, V2 markers from delineator 1204 and clock signal RxLineClk. Pointer processor 1402 may determine the J1 byte location (for HO payload) or V5 byte location (for LO payload). Pointer processor 1402 may provide HO or LO payload (shown as data) and a marker of when HO and LO payload is provided (shown as HO/LO payload marker) as well as an indication of positions of respective J1 or V5 positions (shown as J1/V5 marker).

Decoupling FIFO 1404 may receive the HO or LO payload (shown as data), the J1 or V5 byte marker location, the HO or LO payload marker, clock signal RxLineClk, and clock signal SysClk. Decoupling FIFO 1404 may store data timed according to clock signal RxLineClk. Decoupling FIFO 1404 may provide HO or LO payload (shown as data) when stored in decoupling FIFO 1404 and timed according to clock signal SysClk. Decoupling FIFO 1404 may further provide the J1 or V5 byte marker timed according to clock signal SysClk. Decoupling FIFO 1404 may provide signal valid/invalid to indicate when valid data is output from the FIFO or when invalid data is output from the FIFO (e.g., the FIFO is empty) so that any recipient of the data will either use or ignore the data.

Ingress SRTS calculator 1406 may receive system clock SysClk and the valid/invalid signal from decoupling FIFO 1404. For example, ingress SRTS calculator 1406 may count HO or LO payload bytes provided by decoupling FIFO 1404 based on counting cycles of "valid" signals from decoupling FIFO 1404 over a prescribed period of time. For example, for a HO payload (e.g., STS-1), a prescribed time period may be 125 microseconds. For example, for a LO payload, a prescribed time period may be 500 microseconds.

Ingress SRTS calculator 1406 may sum a count of the difference (positive or negative) between the counted payload bytes during the prescribed time period and a nominal count of payload bytes over the prescribed time period. For example for a STS-1 payload, the nominal count may be 765. The nominal count for LO payload varies based on the type of LO payload (e.g., the nominal count for VT1.5 may be 108, etc.). Ingress SRTS calculator 1406 may provide the sum of the difference as an ingress SRTS value. Ingress SRTS values may be provided to packet scheduler 1218 for transmission in a SONEToAS packet to a destination.

Accordingly, at the input node, a difference between the receive clock rate (RxLine Clk) and system clock rate (SysClk) may be determined and represented as an ingress SRTS value. At the end point node (e.g., an end point line card), justification bytes may be applied where needed based in part on the ingress SRTS values.

For example, the following table provides an example of payload byte count over five time prescribed periods for an STS-1 and corresponding ingress SRTS values.

| Time Period | Payload byte count | ingress SRTS |
| --- | --- | --- |
| 1 | 765 | +0 |
| 2 | 764 | −1 |
| 3 | 763 | −2 |
| 4 | 764 | −1 |
| 5 | 765 | −0 |

In this example, the clock signal SysClk is slightly faster than the clock signal RxLineClk because counted payload bytes are less than an expected amount.

For example, at the ingress node, a device such as packet scheduler 1218 may aggregate ingress SRTS values into SONEToAS packets. In one embodiment, a pointer interpreter may provide an SONEToAS packets with ingress SRTS values to packet scheduler 1218.

For example, a payload of a SONEToAS packet may be filled or partially filled with ingress SRTS associated with HO or LO segments. SONEToAS packets that transport ingress SRTS may use the same FLOW IDs as the associated SONET payload traffic, but use the PDU type "01", as identified in the SONEToAS PI Sub-header. The order of ingress SRTS values in a payload of a SONEToAS packet may be similar to the order of associated HO or LO segments in a payload of a SONEToAS packet. For example, ingress SRTS may be transmitted in a SONEToAS packet that also includes content package maps. For example, a SONEToAS packet including ingress SRTS may be sent whenever pointer interpretation is needed (e.g., every time a H1, H2 or V1, V2 byte pair is detected) or in accordance with SONET guidelines (i.e., once every four SONET frames).

At an end point node, ingress SRTS values transmitted by a source node may be unpacked and associated with HO or LO segments. At the end point node, a difference between the transmit clock rate (TxLine Clk) and system clock rate (SysClk) may be determined and represented as an egress SRTS value. For example, transmit clock TxLineClk may be a replica of the receive clock RxLineClk or generated using a high precision clock synthesizer. Based on a difference between ingress and egress SRTS values for a common HO or LO segment, the end point node may provide justification bytes in overhead during regeneration of SONET frames.

Figure 15:
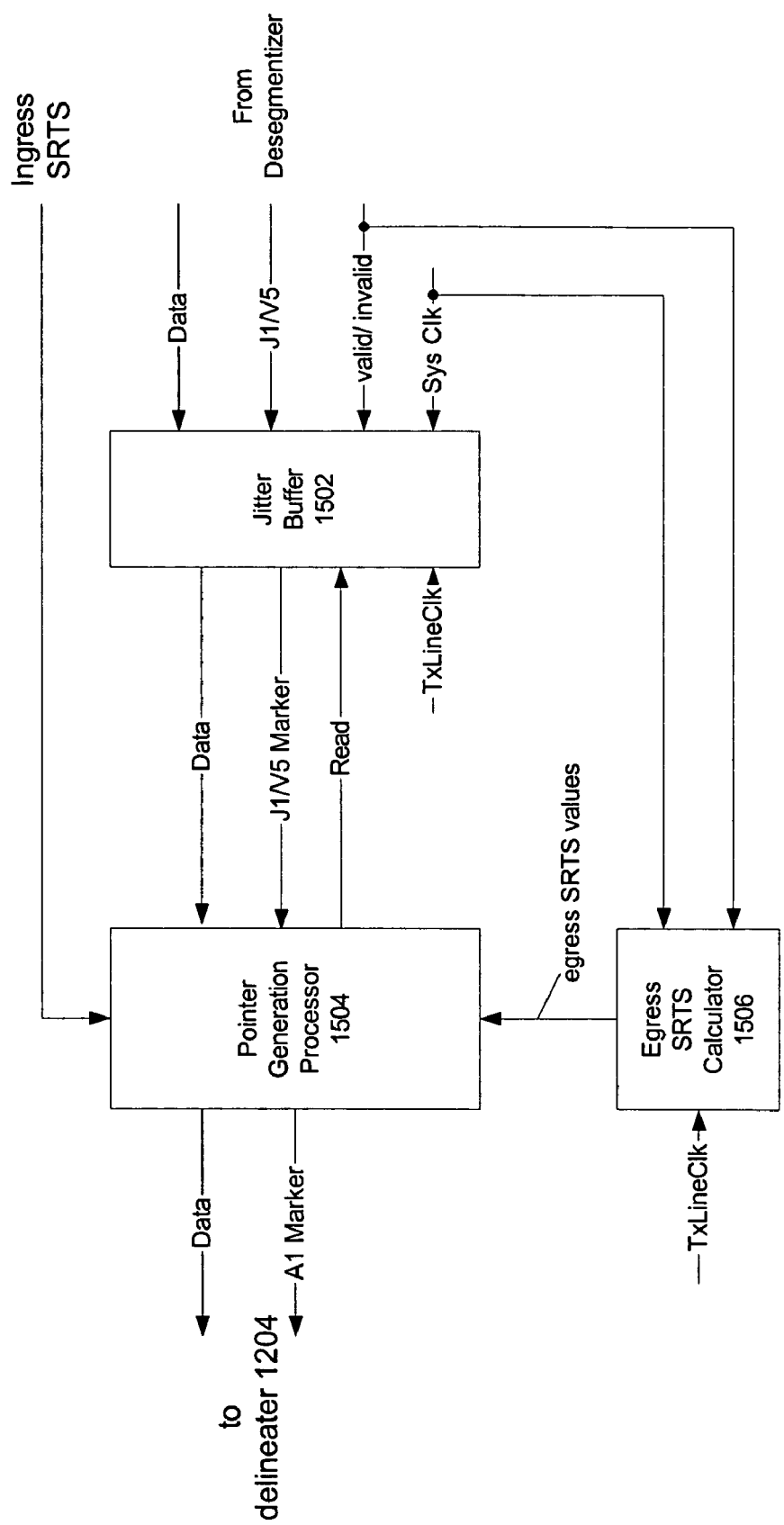
FIG. 15 depicts an example device that can provide pointer justification bytes where needed, in accordance with an embodiment of the present invention.

For example, FIG. 15 depicts in block diagram form an example justification applier 1500 that may be used to provide justification bytes where needed. For example, one embodiment of justification applier 1500 may include jitter buffer 1502, pointer generation processor 1504, and egress SRTS calculator 1506.

Jitter buffer 1502 may store payload bytes (shown as data) timed according to system line clock (SysClk) and may read out HO or LO payload (shown as data). Jitter buffer 1502 may receive J1 or V5 byte markers with the HO or LO payload as well as a payload valid/invalid signal. The payload valid/invalid signal may indicate whether received payload is valid or invalid (i.e., whether the data that jitter buffer 1502 receives is from a switch fabric). Jitter buffer 1502 may not write or store invalid data. Pointer generation processor 1504 may provide a read signal to jitter buffer 1502 and during the active state of the read signal, jitter buffer 1502 may provide HO or LO payload (shown as signal data) to pointer generation processor 1504 as well as J1/V5 markers, both timed according to transmit clock (TxLineClk).

Egress SRTS calculator 1506 may count HO or LO payload bytes from a SONET payload over a prescribed period of time based on transmit clock (TxLineClk). For example, for HO payload (e.g., STS-1), a prescribed time period may be 125 microseconds. For example, for a LO payload, a prescribed time period may be 500 microseconds.

Egress SRTS calculator 1506 may also sum a count of the difference (positive or negative) between the counted HO or LO payload bytes and a nominal count of payload bytes over the prescribed time period. Egress SRTS calculator 1506 may generate egress SRTS values based on the difference, if any. Egress SRTS values may represent a comparison between the clock rate of TxLine Clk with that of SysClk. For example for STS-1 HO payload, the nominal count over the prescribed time period may be 765. The nominal count for LO payload over the prescribed time period varies based on the type of LO payload (e.g., time stamp for VT1.5 may be 108, etc.).

In one embodiment, HO desegmentizer 1252 and LO desegmentizer 1258 may provide ingress SRTS received for example in a SONEToAs packet or through an out-of-band transfer for example using a bus such as, but not limited to, bus 135 to pointer generation processor 1504. Pointer generation processor 1504 may compare egress SRTS values with ingress SRTS values for the same time period or over a different time period or different frames. If the accumulated difference between egress and ingress SRTS values is positive and exceeds a certain threshold, then a positive justification may be requested to be inserted into the relevant SONET overhead. If the accumulated difference between egress and ingress SRTS for the same time period is negative and below a certain threshold, then a negative justification may be requested to be inserted into the relevant SONET overhead. Pointer generation processor 1504 may use multiple levels in each direction (positive or negative) so that as the count penetrates successively higher (or lower) threshold levels, a more frequent pointer justification request is issued for justification correction to be inserted into the relevant SONET overhead.

Accordingly, phase comparisons between the receive clock signal (RxLine Clk) and transmit clock signal (TxLine Clk) can be made by comparing ingress SRTS and egress SRTS values and justification may be applied where there are discrepancies between receive clock signal (RxLine Clk) and transmit clock signal (TxLine Clk). For example, justification may include alteration of H1, H2, H3, and positive stuff opportunity bytes in the SONET overhead to provide for negative or positive justification.

For example, the following table provides an example of HO STS-1 payload byte count over the same five time periods as those provided in the table earlier and corresponding egress SRTS values.

| Time Period | Payload byte count | Egress SRTS |
| --- | --- | --- |
| 1 | 766 | +1 |
| 2 | 768 | +3 |
| 3 | 767 | +2 |
| 4 | 765 | +0 |
| 5 | 766 | +1 |

In this example, the net egress SRTS is +7, whereas the net ingress SRS is −4. Accordingly, the difference between egress and ingress SRTS is +3. In this example, the transmit clock TxLineClk is faster than system clock SysClk. In this example, the rate of receive clock signal (RxLineClk) is less than the rate of system clock (SysClk), which is less than the rate of transmit line clock (TxLineClk).

Pointer generation processor 1504 may receive the valid HO or LO payload (shown as data) from jitter buffer 1502 as well as J1 or V5 marker locations. Pointer generation processor 1504 may determine an A1 boundary byte location for HO or LO payload. Pointer generation processor 1504 may provide HO or LO payload (shown as data) and A1 boundary byte marker.

Figure 16A:
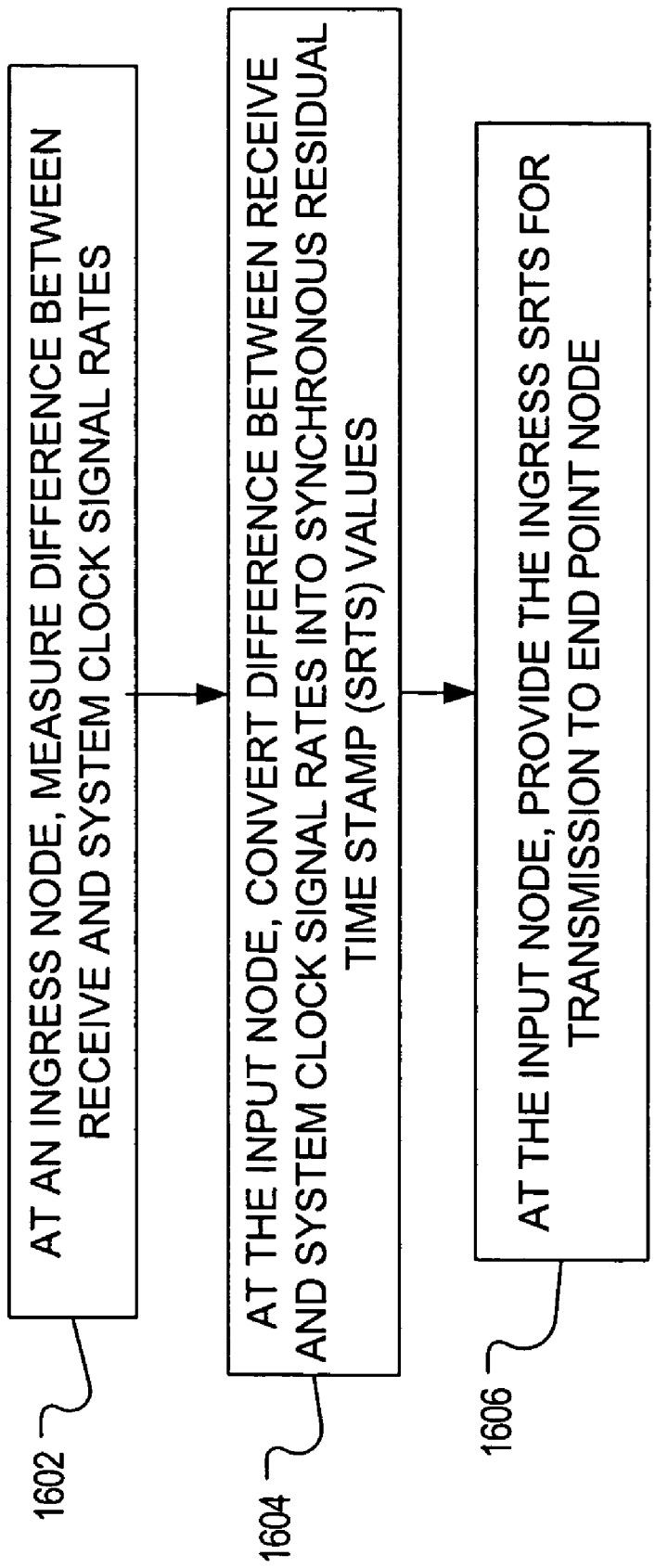
FIG. 16A depicts an example flow diagram to provide ingress synchronous residual time stamps (SRTS) for high and low order payloads, in accordance with an embodiment of the present invention.

FIG. 16A depicts an example flow diagram to provide ingress synchronous residual time stamps (SRTS) for high and low order payloads, in accordance with an embodiment of the present invention.

In block 1602, at an input node, measure difference between receive and system clock signal rates. For example, the difference between receive and system clock signal rates may be based on a difference between counted payload bytes for a payload type (e.g., high or low order) and nominal payload byte amount for the same type.

In block 1604, at the input node, convert difference between receive and system clock signal rates into synchronous residual time stamp values (ingress SRTS values). For example, the ingress SRTS values may be based on a sum of the difference (positive or negative) between the counted payload bytes and nominal count of payload bytes over a period prescribed by a period timer.

In block 1606, at the input node, provide the ingress SRTS for transmission to end node. The ingress SRTS may be encapsulated into a packet (such as in a SONEToAS packet) for transmission to an end point node or transmitted via the control plane network such as a bus.

Figure 16B:
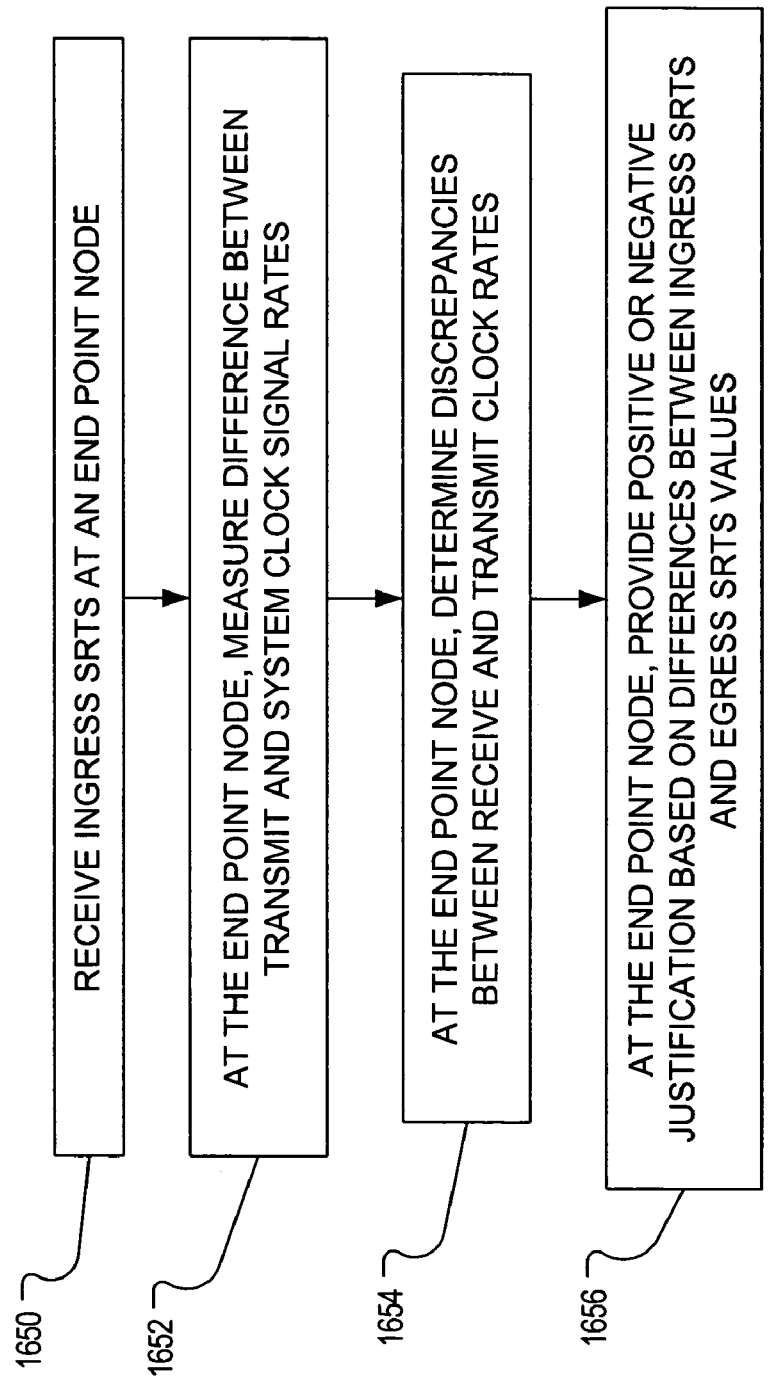
FIG. 16B depicts an example flow diagram to apply justification where needed based in part on ingress synchronous residual time stamps (SRTS) for high and low order payloads, in accordance with an embodiment of the present invention.

FIG. 16B depicts an example flow diagram to apply justification where needed based in part on ingress synchronous residual time stamps (SRTS) for high and low order payloads, in accordance with an embodiment of the present invention.

In block 1650, an end point node receives ingress SRTS. For example, ingress SRTS may be received in a payload of a SONEToAS packet from a switch fabric or received via a control plane network such as a bus.

In block 1652, at the end point node, measure difference between transmit and system clock signal rates. For example, the difference between transmit and system clock signal rates may be based on difference between actual payload byte count for a payload type (e.g., high or low order) and nominal payload byte count for the same payload type. The difference between transmit and system clock signal rates can be summed over discrete time periods and represented as an egress SRTS value. Egress SRTS values may be measured over the same or different time periods as those of the ingress SRTS values.

In block 1654, at the end point node, determine discrepancies between receive and transmit clock rates. For example, determining discrepancies may be derived by subtracting ingress SRTS from egress SRTS for the same or different time periods.

In block 1656, at the end point node, provide positive or negative justification to received payload based on between ingress SRTS and egress SRTS values. If the accumulated difference between ingress and egress SRTS values is positive and exceeds a certain threshold, then a positive justification may be requested to be inserted into the relevant SONET overhead. If the accumulated difference between egress and ingress SRTS for the same time period is negative and below a certain threshold, then a negative justification may be requested to be inserted into the relevant SONET overhead. Multiple levels in each direction (positive or negative) may be used so that as the count penetrates successively higher (or lower) threshold levels, a more frequent pointer justification request is issued for justification correction to be inserted into the relevant SONET overhead.

One embodiment of the present invention provides a manner for host controller 105 to inform the end point node(s) in each destination (e.g., one or more end point line cards) on characteristics and contents of AS packets (including but not limited to SONEToAS packets) (e.g., arrangement of contents in payload). Out-of-band signaling may be used to transmit instructions to each end point node on characteristics and contents of AS packets. For example, maps (i.e., instructions on how to unpackage AS packets) may be assigned based on FLOW IDs. For example, for out-of-band signaling, host controller 105 may utilize bus 135 to transmit maps. New maps may be transmitted out-of-band for each packaging change for a FLOW ID. Thereby, host controller 105 may modify standby maps without affecting data traffic. Each end point node may build a provisioning table based on such instructions that is ready for real-time lookup as AS packets arrive. For example, each end point node may provide up to four (4) maps per FLOW ID, however other numbers of maps may be used. For example, the node that transmits SONEToAS packets may identify the map to be utilized with the AMID field in the SONEToAS PI Sub-header.

In one embodiment, a map may include the following information: (1) number of segments for an aggregation; (2) identification of timeslots from which segments in the aggregation came; (3) identification of destination timeslots that segments in the aggregation will be provided into; (4) size of each segment in an aggregation (e.g., tributary types such as STS-1, VT1.5, VT2, etc.); (5) nominal segment length for HO and LO segments; and (6) end point destination for aggregations (e.g., identify end point line card). However, in a map, not all information in this list need be transmitted and other information may be transmitted.

In one embodiment, a source node may communicate which map each end point node is to use in the SONEToAS PI subheader associated with a SONEToAS packet (i.e., AMID field). For example, the SONEToAS PI subheader may communicate: (1) FLOW ID and (2) a NEW PROVISION FLAG which may indicate which map (new or previously used) to apply to unpack SONEToAS packets.

Figure 17:
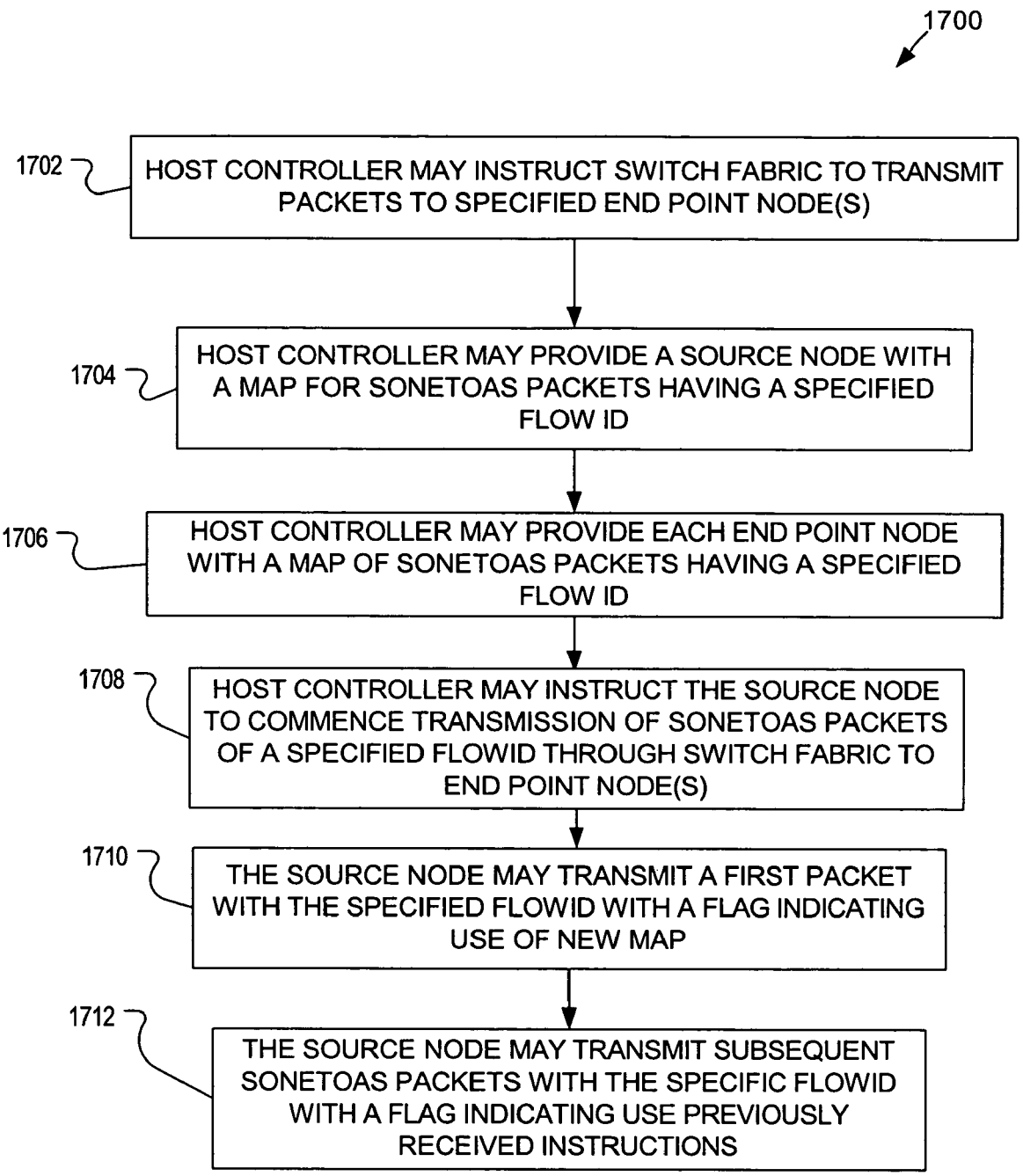
FIG. 17 depicts a process that can be used to provision a switch fabric with end points of AS packets and provide multiple end point node(s) with maps on how to unpack AS packets, in accordance with an embodiment of the present invention, in accordance with an embodiment of the present invention.

FIG. 17 depicts a process that can be used to provision switch fabric 140 with end points of SONEToAS packets and provide multiple end point node(s) with maps on how to unpack SONEToAS packets, in accordance with an embodiment of the present invention. For example, an end point end point node can include a line card.

In block 1702, a host controller (such as but not limited to host controller 105) may instruct switch fabric (such as but not limited to switch fabric 140) to transmit AS packets to specified end point nodes. For example, a destination may be indicated with a unique FLOW ID identifier. For example, host controller may issue a command over a bus (such as bus 135) to the switch fabric which instructs the switch fabric to transmit any packet with a specified FLOWID to specified end point node(s).

In block 1704, the host controller may provide a source node (i.e., a device that transmits packets through the switch fabric to at least one end point node) with a map (i.e., packing instruction) for SONEToAS packets having a specified FLOW ID. For example, the map may specify: (1) relationship of aggregation and timeslots; (2) order of those timeslots in that aggregation; (3) relationship of aggregation and destinations; (4) the type of timeslots (concatenation size); (5) relationship of destination and end point node; and (6) destination type (unicast, multicast). Thereby, the source node may utilize the map to assemble SONEToAS packets having specified FLOWIDs. For example, the host controller may issue the instruction over a bus to the source node.

In block 1706, the host controller may provide each end point node with a map of SONEToAS packets having a specified FLOW ID. For example, the host controller may issue the instruction over the bus to each end point node. Thereafter, each end point node may build a table based on the map which is available to be used to unpack SONEToAS packets having a matching FLOW ID as SONEToAS packets arrive.

In block 1708, the host controller may instruct the source node to commence transmission of SONEToAS packets of a specified FLOWID through the switch fabric to end point node(s).

In block 1710, the source node may transmit a first packet with the specified FLOWID with a flag indicating to use new instructions. For example, the NEW PROVISION FLAG in the SONEToAS PI subheader can be set to indicate to the end point node to utilize a new (most recently received) map.

In block 1712, the source node may transmit subsequent SONEToAS packets with the specific FLOWID with a flag indicating using previously received map. For example, the NEW PROVISION FLAG can be set to indicate to the end point node to utilize a previously used map.

Figure 18:
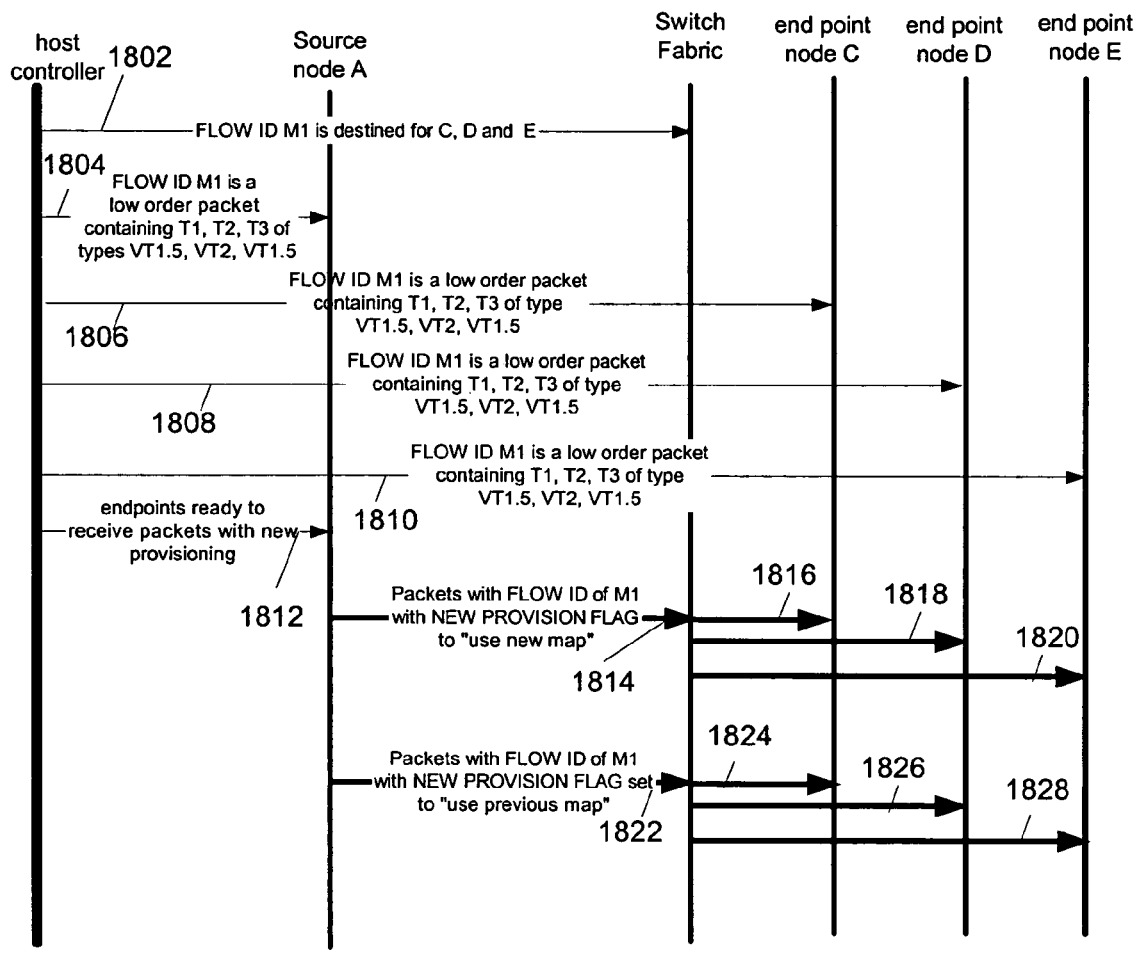
FIG. 18 depicts an example by which a host controller may provide each end point node(s) with a map on how to unpack AS packets, in accordance with an embodiment of the present invention.

FIG. 18 depicts an example by which a host controller may provide each end point node(s) with a map on how to unpack SONEToAS packets.

At 1802, the host controller issues an instruction to a switch fabric that all packets with FLOWID of M1 have a destination of end point nodes C, D, and E. At 1804, the host controller issues an instruction to a source node that any packet with FLOWID M1 includes low order segments having time slots T1, T2, T3 and includes concatenation sizes VT1.5, VT2, VT1.5.

At 1806, 1808, and 1810, the host controller issues maps to respective end point nodes C, D, and E that any packet with FLOWID M1 includes low order segments having time slots T1, T2, T3 and includes concatenation sizes VT1.5, VT2, VT1.5.

At 1812, the host controller issues an instruction to the source node that it may commence transmission of packets having FLOWID M1 through the switch fabric to end point nodes.

At 1814, the source node transmits a packet with FLOWID of M1 and with a NEW PROVISION FLAG set to indicate to the end point nodes are to utilize new (most recently received) map to switch fabric for multicast to end point nodes C, D, and E at respective points 1816, 1818, and 1820. Thereby, end point nodes C, D, and E will apply the most recently received map.

At 1822, the source node transmits to switch fabric 140 a packet with FLOWID of M1 and with a NEW PROVISION FLAG set to indicate to the end point nodes to utilize previously used map. The switch fabric multicasts the packet with FLOWID of M1 to end point nodes C, D, and E at respective points 1824, 1826, and 1828.

Figure 19:
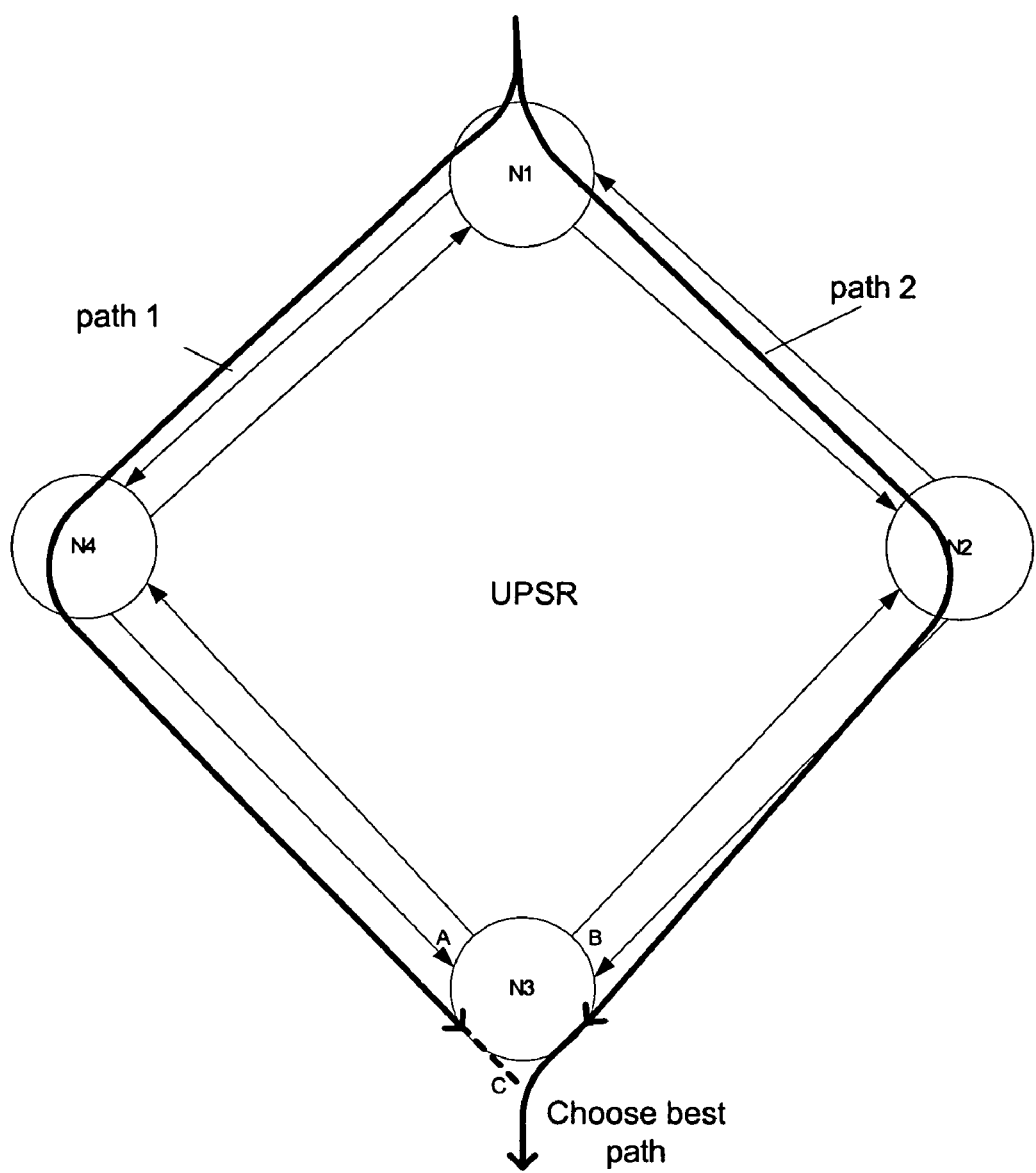
FIG. 19 depicts an example protection partnering scheme.

FIG. 19 depicts an example protection partnering scheme whereby a UPSR from node N1 is received at node N3 by source nodes A and B by way of respective nodes N4 and N2. Source nodes A and B are a protection pair for the UPSR ring having paths 1 and 2. For example, path 1 may be a working path whereas path 2 may be a protection path. In accordance with an embodiment of the present invention, techniques are provided to determine which of nodes A and B are to transmit time slots received from the paths 1 and 2 to an end point node through a switch fabric. For example, other protection schemes can be supported such as but not limited to BLSR, UPSR, SNCP, MS-SPRing, APS, 1+1, 1:1, and 1:N.

In accordance with an embodiment of the present invention, protection group members share protection information (i.e., time slot health information represented for example as loss of signal, bit error rate, AIS, etc.) and protection group members negotiate which member is to transmit signals from a received path at specific time slots. For example, in one embodiment, host controller 105 may communicate out-of-band (e.g., using bus 135) to members of a protection group: (a) protection group member node identification; (b) the type of protection scheme if applicable (such as, but not limited to, BLSR, UPSR, SNCP, MS-SPRing, APS, 1+1, 1:1, and 1:N); and (c) the source node that will initiate the negotiation and determination of which protection group member is to forward signals from a received path at specific time slots.

In one embodiment, any protection group member that receives protection information of all protection group members may decide which protection group member is to forward signals from a received path at each time slot.

The protection group members may communicate with each other using control information encapsulated in AS packets. In one embodiment, control information may include information used in connection with inter-node communication and management such as acknowledgment and decision of connection action (i.e., which protection group member is to transmit at which time slots).

Figure 20:
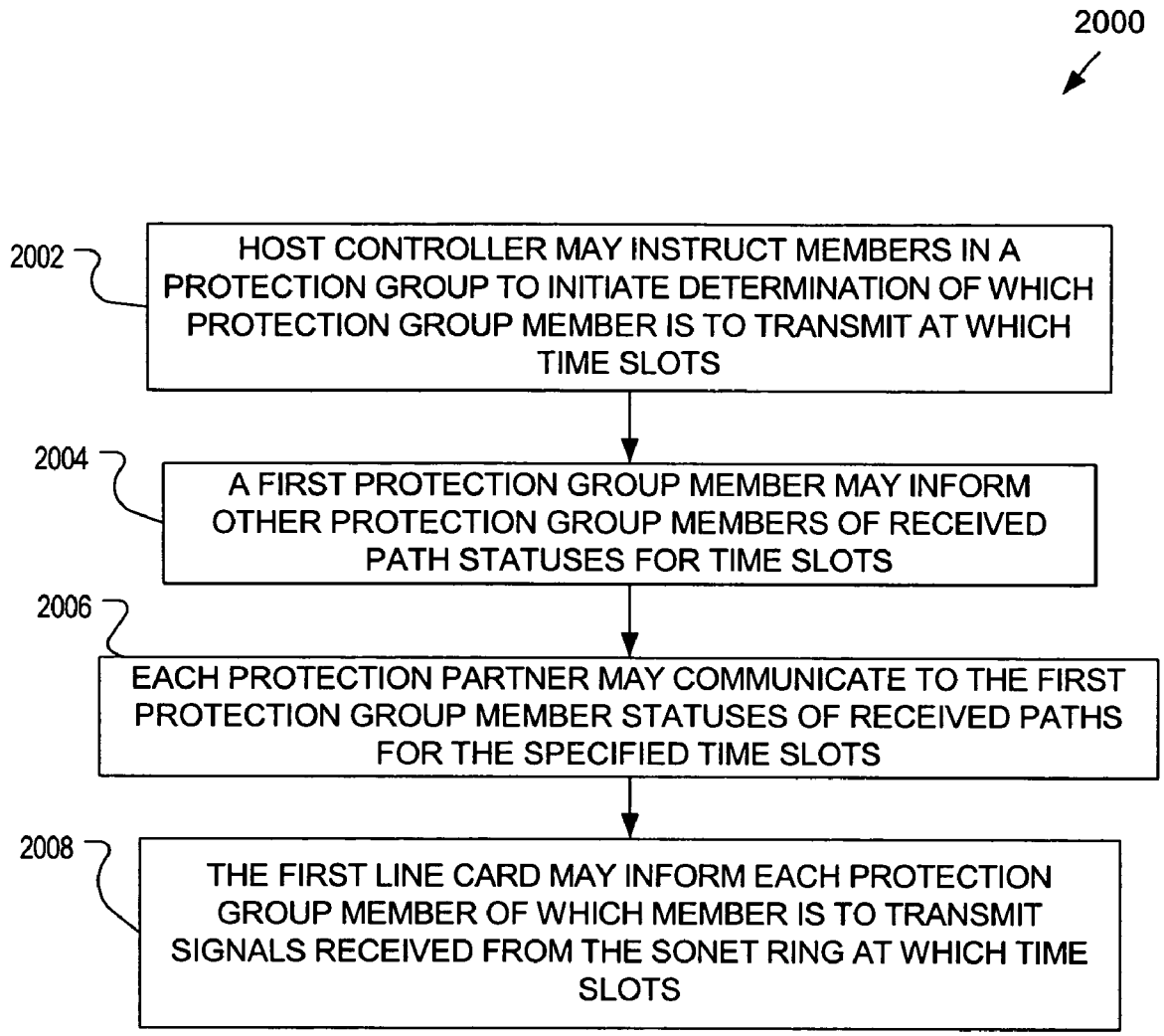
FIG. 20 provides a flow diagram that may be used to determine which protection group member is to transmit signals at selected time slots, in accordance with an embodiment of the present invention.

FIG. 20 depicts an example flow diagram for techniques that may be used by protection group members to decide which protection group member is to transmit at each time slot. The process of FIG. 20 may be repeated periodically for the same time slot ranges to determine which protection group member is to transmit over the time slot ranges.

At block 2002, a host controller (such as but not limited to host controller 105) may instruct members in a protection group to initiate determination of which protection group member is to transmit at which time slots. For example, the host controller may specify: (a) node identifications (e.g., line card identification) of each protection group member; (b) the type of protection scheme if applicable (such as, but not limited to, BLSR, UPSR, SNCP, MS-SPRing, APS, 1+1, 1:1, and 1:N); and (c) the source node that will initiate the negotiation and determination of which protection group member is to forward signals from a received path at specific time slots. For example, in one embodiment, the host controller may communicate such information out-of-band (e.g., using a bus such as but not limited to bus 135). For example, protection group members may each receive signals from paths from the same SONET ring and for the same time slots.

At block 2004, a first protection group member may inform other protection group members of health information of a received path for specified time slots. For example, health information may include loss of signal, bit error rate, AIS, loss of frame, unmatch payload type, etc. (all defined in SONET/SDH specifications) for time slots of the received path.

At block 2006, each protection partner may communicate to the first protection group member health information of a received path for the specified time slots. For example health information may include loss of signal, bit error rate, and AIS for time slots of the received path.

At block 2008, the first line card may inform each protection group member of which member is to transmit signals received from the SONET ring at which time slots. For example, a decision of which protection group member is to transmit at each time slot may be based on a comparison of factors such as, but not limited to, loss of signal, bit error rate, and AIS for such time slot. For example, to determine which protection group member is transmit at each time slot, the first line card may weigh equally or differently factors provided for the time slot such as, but not limited to, loss of signal, bit error rate, and AIS based on the protection scheme used (e.g., BLSR, UPSR, SNCP, MS-SPRing, APS, 1+1, 1:1, and 1:N) or using a proprietary weighting scheme.

Figure 21:
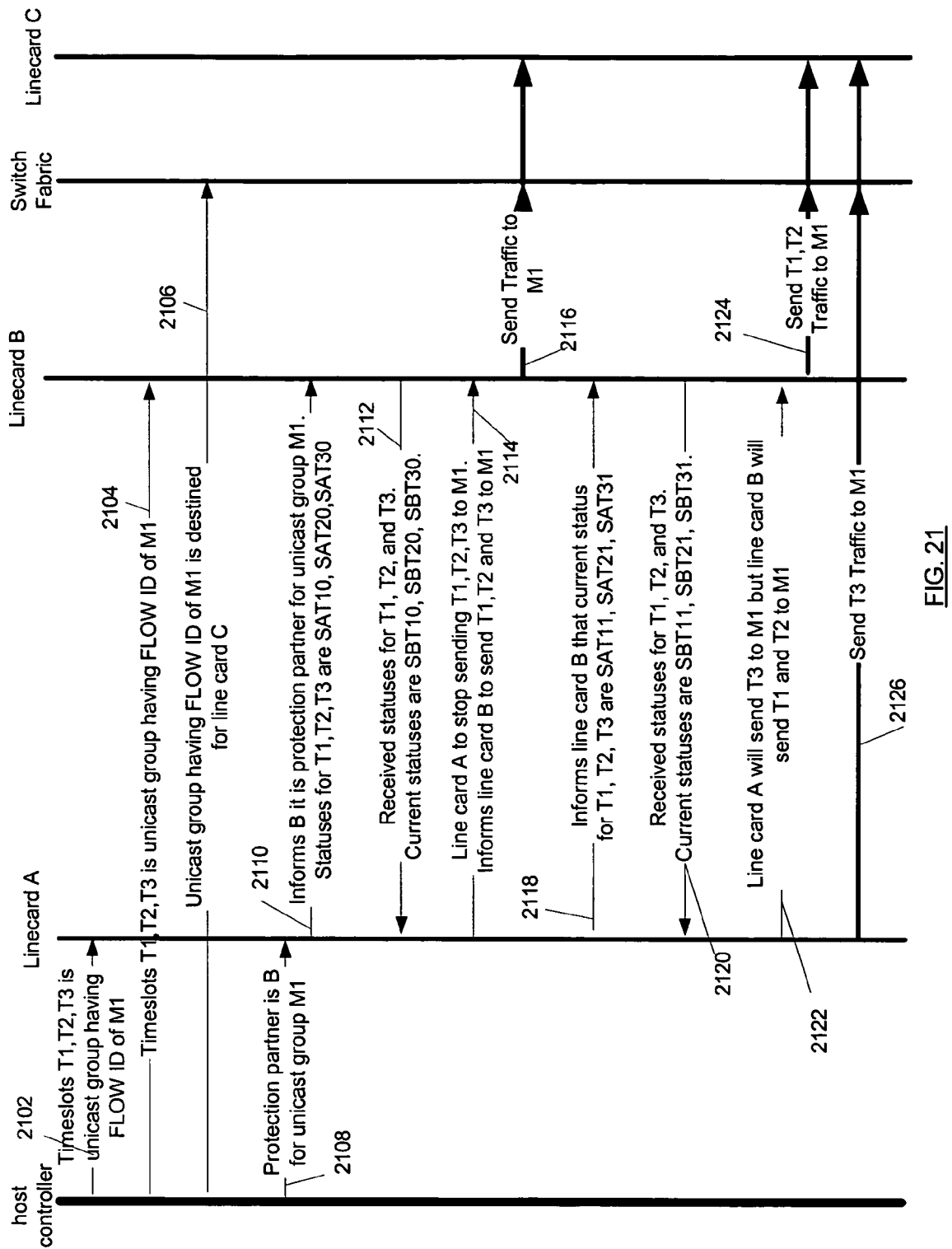
FIG. 21 depicts an example by which protection group members negotiate which member is to transmit signals from a SONET ring over selected time slots in accordance with an embodiment of the present invention.

FIG. 21 depicts an example by which protection group members negotiate which member is to transmit signals from a SONET ring over selected time slots in accordance with an embodiment of the present invention. In this example, line cards A and B are protection partners.

At 2102, the host controller communicates to line card A that signals received from a SONET ring at timeslots T1, T2, T3 are a unicast group and have a FLOW ID of M1. At 2104, the host controller communicates to line card B that signals received from a SONET ring at timeslots T1, T2, T3 are a unicast group and have a FLOW ID of M1. At 2106, host controller 105 communicates to the switch fabric that AS packets with a FLOW ID of M1 have a destination of line card C.

At 2108, the host controller informs line card A that its protection group member includes line card B. At 2110, line card A informs line card B it is protection partner of line card A for unicast group having a FLOW ID of M1 and provides a current status for time slots T1, T2, and T3 as being respective SAT10, SAT20, and SAT30. In this example, SAT10, SAT20, and SAT30 are intended to communicate health statuses of timeslots T1, T2, and T3 measured by line card A such as, but not limited to, loss of signal, bit error rate, and AIS.

At 2112, line card B confirms to line card A receipt of the instruction at 2110 and that the current statuses for time slots T1, T2, and T3 of the path received by line card B are respective SBT10, SBT20, and SBT30. In this example, SBT10, SBT20, and SBT30 are intended to communicate health statuses of timeslots T1, T2, and T3 measured by line card B such, but not limited to, as loss of signal, bit error rate, and AIS.

At 2114, line card A determines line card B has better health statuses for time slots T1, T2, and T3 and communicates to line card B that line card A will discontinue sending time slots T1, T2, and T3. Accordingly, line card B is to transmit signals received from the SONET ring at time slots T1, T2, and T3. At 2116, line card B transmits to the switch fabric at time slots T1, T2, and T3. At 2116, the switch fabric transfers signals having such time slots to the proper end point (i.e., line card C).

At 2118, after a delay of a predetermined time period or when otherwise instructed (e.g., by the host controller), line card A informs line card B it is protection partner of line card A for unicast group M1 and provides current health status for time slots T1, T2, and T3 as respective SAT11, SAT21, and SAT31. In this example, SAT11, SAT21, and SAT31 communicate health statuses of respective timeslots T1, T2, and T3 measured by line card A such as, but not limited to, loss of signal, bit error rate, and AIS.

At 2120, line card B confirms to line card A receipt of the instruction and that the current statuses for time slots T1, T2, and T3 of the path received by line card B are respective SBT11, SBT21, and SBT31. In this example, SBT11, SBT21, and SBT31 communicate statuses of timeslots T1, T2, and T3 measured by line card B such as, but not limited to, loss of signal, bit error rate, and AIS. At 2122, based on a comparison of health information for time slots T1, T2, and T3, line card A instructs line card B to transmit at time slots T1 and T2 but informs line card B that line card A will transmit at time slot T3.

At 2124, line card B transmits time slots T1 and T2 to the switch fabric. At 2126, line card A sends time slot T3 to switch fabric. The switch fabric transfers the time slots to the programmed end points.

One of the requirements of a SONET transport node is the ability to multicast circuit streams within the SONET hierarchy and across ports. In a node, line-cards may be input ports to a switch fabric and line-cards may receive information from output ports of the switch fabric.

Figure 22:
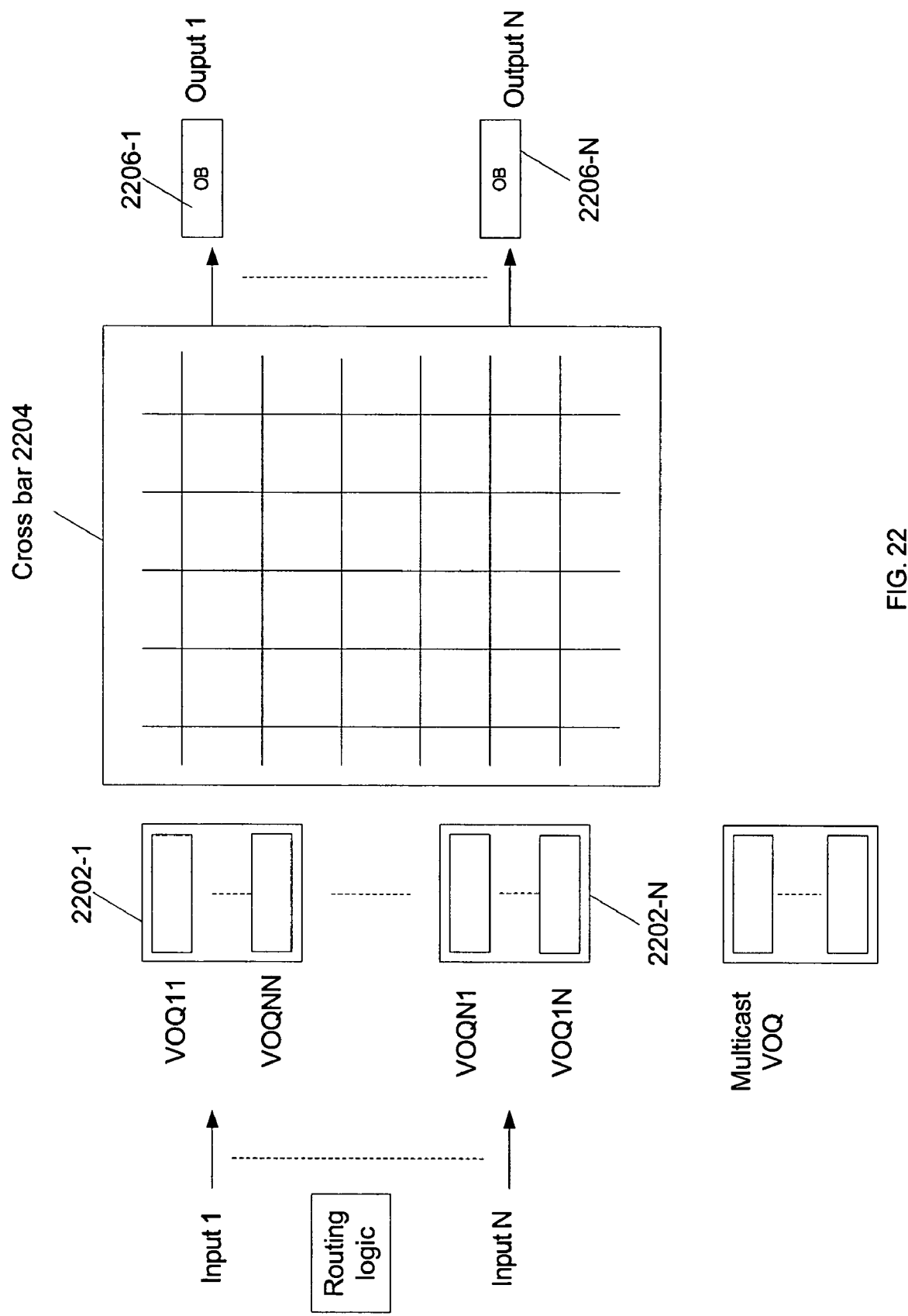
FIG. 22 depicts an example switch fabric system, in accordance with an embodiment of the present invention.

For example, FIG. 22 depicts an example switch fabric system that includes multiple input ports 1 to N, output ports 1 to N, a cross bar, routing logic, unicast and multicast virtual output queues (VOQs), and output buffers, in accordance with an embodiment of the present invention. Each of input ports 1 to N may provide packets to the switch fabric for routing to any of output ports 1 to N. Each of the input ports 1 to N may utilize a VOQ for storing packets destined for any of the output ports 1 to N. In one embodiment, a VOQ associated with each input port may include a queue for each of output ports 1 to N and capable to store packets to be transferred to each of output ports 1 to N. For example, unicast VOQs 2202-1 to 2202-N may be assigned as VOQs for respective input ports 1 to N. For example, one or more line cards may provide packets to any of input ports 1 to N. The multicast VOQ may stores packets for multicast transmission.

For example, a header of each packet may identify a destination port for the packet. For example, routing logic may inspect the header of each packet to determine a VOQ is to store the packet and then cause the packet to be stored in the proper VOQ.

Each of output ports 1 to N may utilize an associated output buffer 2206-1 to 2206-N to receive and store packets transmitted by cross bar 2204. Cross bar 2204 may schedule transfer of packets to any of output buffers 2206-1 to 2206-N from any of VOQs 2202-1 to 2202-N or the multicast VOQ. Cross bar 2204 may be Advanced Switching compatible although other formats may be supported. For example, the cross bar may be a unified fabric system. One or more line cards may receive packets from any of output ports 1 to N.

For example, cross bar 2204 may apply a scheduling scheme to transfer packets into output buffers. For example, for multicast transmission of packets from multicast VOQ, crossbar 2204 may transmit packets to multicast destinations when all destination output buffers are available to receive packets at the same time. Scheduling of multicast packet transmissions competes with scheduling of unicast packet transmissions for transmission availability and space in output buffers. Example cross bar scheduling schemes may be based on a storage level of output buffers and priority of connections, as well as other factors.

One embodiment of the present invention provides for unicasting packets scheduled for multicast when the line utilization rate for use in unicasting packets scheduled for multicast is within the acceptable line rate. Unicasting packets scheduled for multicast may be implemented by copying a packet to be multicast into a queue of each unicast VOQ associated with each of the multicast destination output ports. After utilization of the acceptable line rate is exceeded, then packets to be multicast may be copied into a multicast VOQ for transmission to at least one of the multicast destinations.

For example, for deterministic TDM/circuit traffic, line utilization rate may be a number of timeslots being transported by a line. For example, for a line that has an available bandwidth to carry 10 Gigabits/second (or 192 STS1 timeslots), the line would be 50% utilized if only 96 STS1 timeslot are transmitted. An acceptable limit for a line utilization may be determined from: raw bandwidth (the speed the line can handle), data rate (the actual rate payload portion of any packets is transmitted over the line), and the available bandwidth (the maximum rate that the fabric can handle without over loading the queues inside). For example, the available bandwidth may run at 70% of the raw bandwidth, and the data rate may be a portion of the available bandwidth depending on the ratio of the header and payload in a packet. For example, acceptable line rate may be equal to the available bandwidth. The "acceptable line rate" may be the rate at which the cross bar can receive packets from an input port without internal congestion or dropped packets. A "line" may be a single port to the cross bar.

For example, if the acceptable line rate of an input port is 70%, the ingress port line rate is 35% utilized, and all packets are to be dualcast, then each of the incoming packets can be copied into unicast VOQs for dual cast transmission. However, if the acceptable line rate of an input port is 70%, the ingress port line rate is 65% utilized, and all packets are to be dualcast, then a remaining 5% of the bandwidth can be utilized to copy packets into unicast VOQs to be transmitted dualcast. The remaining packets to be dualcast may be copied into the multicast VOQ. The multicast VOQ transmits the packets to the destinations not provided for by the unicast VOQs, if any.

For multicast, the cross bar may copy packets to one or more output buffers. In accordance with an embodiment of the present invention, the size of output buffers may be increased to handle bursty transmission. In accordance with an embodiment of the present invention, overspeed may be applied where traffic is deterministic (e.g., SONET or TDM/ circuit traffic) to prevent the acceptable line rate from being underutilized due to head of line blocking. Head of line blocking can occur with multicast queues whereby a multicast packet waits to be copied into queues associated with all destinations and thereby blocks other packets in line from being copied to destinations. For example, applying a crossbar overspeed of N/2, where N is the maximum possible number of output ports that can be multicast destinations. Overspeed is a ratio of rate of output from a VOQ over rate of input to a VOQ. However, time to store packets from an input port to multiple queues of a VOQ for multicast to multiple to output ports must meet SONET latency requirements.

The system of FIG. 22 may be implemented as any or a combination of: hardwired logic, software stored by a memory device and executed by a microprocessor, firmware, an application specific integrated circuit (ASIC), and/or a field programmable gate array (FPGA).

Modifications

The drawings and the forgoing description gave examples of the present invention. Although depicted as a number of disparate functional items, those skilled in the art will appreciate that one or more of such elements may well be combined into single functional entities. Alternatively, certain elements may be split into multiple functional elements. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method comprising:
   providing a plurality of Advanced Switching compliant packets to an Advanced Switching compatible switch fabric for transmission to at least one endpoint, wherein each of the plurality of Advanced Switching compliant packets includes a header and a payload portion and wherein at least one of the plurality of Advanced Switching compliant packets includes one of control information, protection information, portions of a SONET frame, data packets and frames, or ingress synchronous residual time stamps,
   wherein the providing includes:
      aggregating SONET tributaries, and
      encapsulating the aggregated SONET tributaries into a payload of an Advanced Switching compliant packet, and
   wherein the aggregating comprises:
      aggregating high order tributaries having the same destination and having the same packet rate into a payload of an Advanced Switching compliant packet, and
      aggregating low order tributaries having the same destination and having the same packet rate into a payload of an Advanced Switching compliant packet.

2. The method of claim 1, wherein the aggregating comprises:
   combining segments including high order (HO) tributaries into a payload of an Advanced Switching compliant packet, wherein the combining segments including HO tributaries comprises:
      for each HO tributary segment, providing a HO preamble, wherein the HO preamble identifies a location of a J1 byte in the HO segment, and
      selectively providing a flow pad in the payload to provide 32-bit double word (DWORD) alignment.

3. The method of claim 1, wherein the aggregating comprises:
   combining segments including low order (LO) tributaries into a payload of an Advanced Switching compliant packet, wherein the combining segments including LO tributaries comprises:
      for at least two LO tributary segments, providing a LO preamble, wherein the LO preamble identifies a location of a V5 byte in the LO segment, and
      selectively providing a flow pad in the payload to provide 32-bit double word (DWORD) alignment.

4. The method of claim 1, further comprising:
   determining synchronous residual time stamps based on a difference between a receive rate of SONET payload bytes and a system clock rate; and
   providing the synchronous residual time stamps in a payload of at least one of the Advanced Switching compliant packets.

5. The method of claim 4, wherein the determining synchronous residual time stamps comprises:
   determining synchronous residual time stamps for high order SONET payload based on a difference between a nominal high order SONET payload count and a high order SONET payload count over a prescribed time period; and
   determining synchronous residual time stamps for low order SONET payload based on a difference between a nominal low order SONET payload count and a low order SONET payload count over a prescribed time period.

6. The method of claim 1, further comprising:
   communicating to an Advanced Switching compatible switch fabric at least one destination for at least one of the plurality of Advanced Switching compliant packets.

7. The method of claim 1, further comprising:
   determining which line card among a protection group is to transmit SONET traffic at each time slot based on protection information of the protection group.

8. The method of claim 1, further comprising:
   receiving instructions on how to form contents of Advanced Switching compliant packets, wherein the instruction includes instruction on flow identifier type, high or low order segment ordering, and high or low order type of traffic.

9. The method of claim 1, wherein the header of at least one of the plurality of Advanced Switching compliant packets comprises a SONET protocol interface subheader comprising:
   a type field to indicate contents of the Advanced Switching compliant packet;
   an active map identifier field to identify a map to use to unpack contents of an Advanced Switching compliant packet;
   a flow identifier field to identify a unique packet type sent by a unique source to specific end point nodes and having a specific payload content and payload arrangement;
   sequence number field to identify a sequence number of a particular packet; a segmentation and reassembly field to identify whether segmentation and reassembly has been applied;
   a segmentation and reassembly segment number field to maintain order of segmented groups of bits; and
   a new provision flag to indicate whether a new or previously used map is to be applied to unpack contents of the current Advanced Switching compliant packet.

10. An apparatus comprising:
a SONET frame-to-packet converter to receive a plurality of SONET frames, wherein each of the SONET frames includes header and payload portions and wherein the SONET frame-to-packet converter comprises:
a segmentation and aggregation device to:
segment high and low order SONET tributaries from the payload portions into segments based on the destination and the packet rate of the high and low order tributaries, and
form Advanced Switching compliant packets, wherein each Advanced Switching compliant packet includes header and payload portions and wherein the payload portion includes at least one of high or low order segments; and
a packet scheduler to at least receive packets substantially in an Advanced Switching compatible format and provide a plurality of packets in an Advanced Switching compatible format for transmission to an Advanced Switching compatible switching fabric, wherein at least one of the provided plurality of packets includes at least one of control information, protection information, portions of a SONET frame, data packets and frames, or ingress synchronous residual time stamps.

11. The apparatus of claim 10, further comprising:
ingress synchronous time stamp logic to determine the ingress synchronous residual time stamps based on a difference between a receive rate of SONET payload bytes and a system clock rate.

12. The apparatus of claim 11, wherein the ingress synchronous time stamp logic to determine ingress synchronous residual time stamps is to:
determine ingress synchronous residual time stamps for high order SONET payload based on a difference between a nominal high order SONET payload count and a high order SONET payload count over a prescribed time period;
determine ingress synchronous residual time stamps for low order SONET payload based on a difference between a nominal low order SONET payload count and a low order SONET payload count over a second prescribed time period; and
provide the synchronous residual time stamps to the packet scheduler for transmission.

13. The apparatus of claim 10, wherein the segmentation and aggregation device is to:
combine segments including high order (HO) tributaries into a common payload of an Advanced Switching compliant packet, wherein to combine segments including HO tributaries comprises logic to:
for each HO tributary segment, provide a HO preamble, wherein the HO preamble identifies a location of a J1 byte in the HO segment, and
selectively provide a flow pad in the payload to provide 32-bit double word (DWORD) alignment.

14. The apparatus of claim 10, wherein the segmentation and aggregation device is to:
combine segments including low order (LO) tributaries into a common payload of an Advanced Switching compliant packet, wherein the to combine LO tributaries comprises logic to:
for at least two LO tributary segments, provide a LO preamble, wherein the LO preamble identifies a location of a V5 byte in the LO segment, and
selectively provide a flow pad in the payload to provide 32-bit double word (DWORD) alignment.

15. The apparatus of claim 10, further comprising logic to determine which line card among a protection group is to transmit SONET traffic at each time slot based on protection information of the protection group.

16. The apparatus of claim 10, wherein the SONET frame-to-packet converter receives instructions on how to form Advanced Switching compliant packets, wherein the instruction include instructions on flow identifier type, high or low order segment ordering, and high or low order type of traffic.

17. A method comprising:
receiving a plurality of Advanced Switching compatible packets from an Advanced Switching compatible switch fabric, wherein at least one of the plurality of Advanced Switching compatible packets includes at least one of control information, protection information, portions of a SONET frame, data packets and frames, or ingress synchronous residual time stamps;
receiving at least one man on how to unpack packets, wherein the at least one map identifies at least high or low order segment ordering and high or low order type of traffic within an Advanced Switching compatible packet;
aggregating contents of the packet including portions of a SONET frame; and wherein the aggregating comprises:
aggregating high order tributaries having the same destination and having the same packet rate into a payload of an Advanced Switching compliant packet, and aggregating low order tributaries having the same destination and having the same packet rate into a payload of an Advanced Switching compliant packet;
forming a portion of a SONET frame from contents of the packet including portions of a SONET frame.

18. The method of claim 17, further comprising: determining which map to apply on how to unpack packets based on a field in a header of a received packet.

19. The method of claim 17, wherein Advanced Switching compatible packets include header and payload portions and wherein an Advanced Switching compatible packet having a payload that includes portions of a SONET frame includes a SONET protocol interface subheader and wherein the SONET protocol interface subheader includes:
a type field to indicate contents of the Advanced Switching compliant packet;
an active map identifier field to identify a map to use to unpack contents of an Advanced Switching compliant packet;
a flow identifier field to identify a unique packet type sent by a unique source to specific end point nodes and having a specific payload content and payload arrangement;
sequence number field to identify a sequence number of a particular packet;
a segmentation and reassembly field to identify whether segmentation and reassembly has been applied;
a segmentation and reassembly segment number field to maintain order of segmented groups of bits; and
a new provision flag to indicate whether a new or previously used map is to be applied to unpack contents of the current Advanced Switching compliant packet.

20. The method of claim 17, wherein Advanced Switching compatible packets include header and payload portions and wherein a payload portion of an Advanced Switching compatible packet including portions of a SONET frame includes:
segments including high order tributaries;
preambles for the segments including high order tributaries, wherein preambles identify J1 byte locations in the segments including high order tributaries.

21. The method of claim 17, wherein Advanced Switching compatible packets include header and payload portions and wherein a payload portion of an Advanced Switching compatible packet including portions of a SONET frame includes: segments including low order tributaries; preambles for the segments including low order tributaries, wherein preambles identify V5 byte locations in the segments including low order tributaries.

22. The method of claim 17, further comprising:
extracting ingress synchronous residual time stamps from at least one Advanced Switching compatible packet;
determining an extent to apply justification to a formed SONET frame based on the ingress synchronous residual time stamps and a discrepancy between a transmit clock signal rate and a system clock signal rate; and
providing positive or negative justification for overhead of formed SONET frames based on the extent.

23. The method of claim 22, wherein the determining the discrepancy between the transmit clock signal rate and the system clock signal rate comprises:
determining synchronous residual time stamps for high order SONET payload based on a difference between a nominal high order SONET payload count and a high order SONET payload count over a prescribed time period; and
determining synchronous residual time stamps for low order SONET payload based on a difference between a nominal low order SONET payload count and a low order SONET payload count over a second prescribed time period.

24. The method of claim 17, wherein an Advanced Switching compatible packet including portions of a SONET frame includes one of high or low order segments and wherein forming a portion of a SONET frame comprises:
restoring high order segments received in the packet including portions of a SONET frame into synchronous transport signal (STS) groupings; and
restoring low order segments received in the packet including portions of a SONET frame into virtual tributary (VT) groupings.

25. The method of claim 17, wherein forming a portion of a SONET frame comprises:
generating overhead for the SONET frames; and
forming a portion of the SONET frame payload from the synchronous transnort signal (STS) and virtual tributary (VT) groupings.

26. An apparatus comprising:
a packet-to-frame converter to receive a plurality of Advanced Switching compatible packets, wherein at least one of the plurality of Advanced Switching compatible packets includes at least one of control information, protection information, portions of a SONET frame, data packets and frames, or ingress synchronous residual time stamps, the packet-to-frame converter including:
a packet classifier to transfer Advanced Switching compatible packets for processing by one of a plurality of processing devices; and
a de-segmentation and de-aggregation device to receive an Advanced Switching compatible packet including portions of a SONET frame and to store contents of the Advanced Switching compatible packet including portions of a SONET frame and to form a portion of a SONET frame from contents of the Advanced Switching compatible packet including portions of a SONET frame wherein the Advanced Switching compatible packet including portions of a SONET frame comprises: segments including high order tributaries; preambles for the segments including high order tributaries; wherein the Advanced Switching compatible packet including portions of a SONET frame comprises: segments including low order tributaries; preambles for the segments including low order tributaries.

27. The apparatus of claim 26, wherein the packet-to-frame converter is to receive a map instructing how to unpack at least one of the plurality of Advanced Switching compatible packets, wherein the map identifies at least segment content and type of the payload of at least one the Advanced Switching compatible packets.

28. The apparatus of claim 27, wherein the packet-to-frame converter is to determine which map to apply to unpack at least one received Advanced Switching compatible packet based on a field in a header of the received Advanced Switching compatible packet.

29. The apparatus of claim 26, wherein at least one of the Advanced Switching compatible packets includes a SONET protocol interface subheader and wherein the SONET protocol interface subheader includes:
a type field to indicate contents of the packet;
an active map identifier field to identify a map to use to unpack contents of a packet;
a flow identifier field to identify a unique SONEToAS packet type sent by a unique source to specific end point nodes and having a specific payload content and payload arrangement;
sequence number field to identify a sequence number of a particular SONEToAS packet;
a segmentation and reassembly field to identify whether segmentation and reassembly has been applied;
a segmentation and reassembly segment number field to maintain order of segmented groups of bits; and
a new provision flag to indicate whether a new or previously used map is to be applied to unpack contents of the current packet.

30. The apparatus of claim 26, wherein one of a plurality of processing devices comprises logic to:
receive ingress synchronous residual time stamps;
determine an extent to apply justification to at least one formed SONET frame based on the received synchronous residual time stamps and a discrepancy between a transmit clock signal rate and a system clock signal rate; and
provide positive or negative justification for overhead of the at least one formed SONET frame based on the extent.

31. The apparatus of claim 30, wherein the logic to determine an extent to apply justification further comprises logic to:
determine the discrepancy between the transmit clock signal rate and the system clock signal rate by:
determining synchronous residual time stamps for high order SONET payload based on a difference between a nominal high order SONET payload count and a high order SONET payload count over a prescribed time period; and
determining synchronous residual time stamps for low order SONET payload based on a difference between a nominal low order SONET payload count and a low order SONET payload count over a prescribed time period.

32. The apparatus of claim 26, wherein one of a plurality of processing devices comprises logic to:

selectively reassemble one of segmented control information or data packets received in at least one of the plurality of packets.

33. The apparatus of claim 26, wherein one of a plurality of processing devices comprises logic to:
  restore high order segments received in the Advanced Switching compatible packet including portions of a SONET frame into synchronous transport signal (STS) groupings; and
  restore low order segments received in the Advanced Switching compatible packet including portions of a SONET frame into virtual tributary (VT) groupings.

34. The apparatus of claim 33, further comprising logic to:
  generate overhead for at least one SONET frame; and
  form a payload for at least one SONET frame from the synchronous transport signal (STS) or virtual tributary (VT) groupings.

35. The apparatus of claim 26, further comprising logic to transmit SONET frames having payloads that include at least one of portions of a SONET frame or data packets and frames.

36. A system comprising:
  an Advanced Switching (AS) format compliant switch fabric;
  a first line card capable to receive AS format compliant packets from the switch fabric and to transmit AS format compliant packets to the switch fabric; and
  a second line card capable to receive AS format compliant packets from the switch fabric and to transmit AS format compliant packets to the switch fabric and comprising:
  a SONET frame-to-packet converter to receive a plurality of SONET frames, wherein each of the SONET frames includes header and payload portions and wherein the SONET frame-to-packet converter comprises:
  a segmentation and aggregation device to:
  segment SONET high and low order tributaries from the payload portions into segments based on the destination and the packet rate of the high and low order tributaries, and
  form Advanced Switching compliant packets, wherein each Advanced Switching compliant packet includes header and payload portions and wherein the payload portion includes at least one of high or low order segments; and
  a packet scheduler to at least receive packets substantially in an Advanced Switching compatible format and provide a plurality of packets in an Advanced Switching compatible format for transmission to an Advanced Switching compatible switching fabric, wherein at least one of the provided plurality of packets includes at least one of control information, protection information, portions of a SONET frame, data packets and frames, or ingress synchronous residual time stamps.

37. The system of claim 36, wherein the first line card comprises a SONET add-drop multiplexer.

38. The system of claim 36, wherein the first line card comprises an Ethernet line input.

39. A system comprising:
  an Advanced Switching (AS) format compliant switch fabric;
  a first line card capable to receive AS format compliant packets from the switch fabric and to transmit AS format compliant packets to the switch fabric; and
  a second line card capable to receive AS format compliant packets from the switch fabric and to transmit AS format compliant packets to the switch fabric and comprising:
  a packet-to-frame converter to receive a plurality of Advanced Switching compatible packets, wherein at least one of the plurality of Advanced Switching compatible packets includes at least one of control information, protection information, portions of a SONET frame, data packets and frames, or ingress synchronous residual time stamps, the packet-to-frame converter including:
  a packet classifier to transfer Advanced Switching compatible packets for processing by one of a plurality of processing devices; and
  a de-segmentation and de-aggregation device to receive an Advanced Switching compatible packet including portions of a SONET frame and to store contents of the Advanced Switching compatible packet including portions of a SONET frame and to form a portion of a SONET frame from contents of the Advanced Switching compatible packet including portions of a SONET frame
  wherein the Advanced Switching compatible packet including portions of a SONET frame comprises: segments including high order tributaries; preambles for the segments including high order tributaries; wherein the Advanced Switching compatible packet including portions of a SONET frame comprises: segments including low order tributaries; preambles for the segments including low order tributaries.

40. The system of claim 39, wherein the first line card comprises a SONET add-drop multiplexer.

41. The system of claim 39, wherein the first line card comprises an Ethernet line input.

* * * * *